US009465786B2

(12) United States Patent
Lurey et al.

(10) Patent No.: US 9,465,786 B2
(45) Date of Patent: Oct. 11, 2016

(54) METHOD FOR FACILITATING QUICK LOGINS FROM A MOBILE DEVICE

(71) Applicant: Keeper Security, Inc., Chicago, IL (US)

(72) Inventors: Craig B. Lurey, El Dorado Hills, CA (US); Darren S. Guccione, Wheaton, IL (US)

(73) Assignee: KEEPER SECURITY, INC., Chicago, IL (US)

( * ) Notice: Subject to any disclaimer, the term of this patent is extended or adjusted under 35 U.S.C. 154(b) by 161 days.

(21) Appl. No.: 14/175,466

(22) Filed: Feb. 7, 2014

(65) Prior Publication Data

US 2014/0157390 A1  Jun. 5, 2014

Related U.S. Application Data

(63) Continuation-in-part of application No. 12/868,722, filed on Aug. 26, 2010, now Pat. No. 8,738,934, which is a continuation-in-part of application No. 12/546,881, filed on Aug. 25, 2009, now Pat. No. 8,656,504.

(51) Int. Cl.
*G06F 3/048* (2013.01)
*G06F 17/24* (2006.01)
(Continued)

(52) U.S. Cl.
CPC ........... *G06F 17/243* (2013.01); *G06F 21/123* (2013.01); *G06F 21/31* (2013.01);
(Continued)

(58) Field of Classification Search
CPC .. G06F 21/31; G06F 21/604; G06F 21/6218; G06F 21/6245; G06F 17/243; H04L 63/083
See application file for complete search history.

(56) References Cited

U.S. PATENT DOCUMENTS 6,651,217 B1 * 11/2003 Kennedy ............... G06F 17/243
715/224
6,732,278 B2   5/2004 Baird et al.
(Continued)

FOREIGN PATENT DOCUMENTS

JP          10336167         12/1998

OTHER PUBLICATIONS

Switcher. "Safari Autofill for iPhone and iPod touch", Jan. 2008, pp. 01-07, http://www.switchersblog.com/2008/01/safari-autofill.html.*

(Continued)

*Primary Examiner* — Jung Kim
*Assistant Examiner* — Carlos M De Jesus Lassala
(74) *Attorney, Agent, or Firm* — Klintworth & Rozenblat IP LLC

(57) ABSTRACT

A computer-implemented method is provided for facilitating a quick login using a mobile computing device having a space-wise limited virtual keyboard. The method includes detecting a response from a server of a website or from an application native to the computing device that includes a login form displayed on a screen of the mobile computing device for authenticating a user, activating an application on the mobile computing device configured to auto fill the login form, and displaying a quick login keyboard, which includes a plurality of boxes configured to hold credential data of the user, wherein the quick login keyboard further includes a plurality of fill buttons, each of which is associated with one of the credential data boxes. The method further includes detecting a tapping on one of the plurality of fill buttons, and populating the login form with the credential data associated with the tapped fill button.

19 Claims, 27 Drawing Sheets

(51) Int. Cl.
*G06F 21/12* (2013.01)
*G06F 21/31* (2013.01)
*G06F 21/60* (2013.01)
*G06F 21/62* (2013.01)
*H04L 29/06* (2006.01)
*G06F 21/41* (2013.01)

(52) U.S. Cl.
CPC ............ *G06F 21/41* (2013.01); *G06F 21/602* (2013.01); *G06F 21/604* (2013.01); *G06F 21/6218* (2013.01); *G06F 21/6245* (2013.01); *H04L 63/083* (2013.01); *G06F 2221/2111* (2013.01); *G06F 2221/2141* (2013.01); *G06F 2221/2143* (2013.01); *H04L 63/168* (2013.01)

(56) References Cited

U.S. PATENT DOCUMENTS

| | | | |
|---|---|---|---|
| 7,644,860 | B2 | 1/2010 | Matsushita et al. |
| 7,945,586 | B1 | 5/2011 | Fang et al. |
| 2002/0016912 | A1 | 2/2002 | Johnson |
| 2002/0051540 | A1 | 5/2002 | Glick et al. |
| 2002/0055909 | A1 | 5/2002 | Fung et al. |
| 2003/0130957 | A1 | 7/2003 | Best et al. |
| 2004/0117651 | A1 | 6/2004 | Little et al. |
| 2005/0251491 | A1 | 11/2005 | Medina et al. |
| 2005/0257057 | A1 | 11/2005 | Ivanov et al. |
| 2007/0061266 | A1 | 3/2007 | Moore et al. |
| 2008/0060052 | A1 | 3/2008 | Hwang et al. |
| 2008/0065729 | A1 | 3/2008 | Haas |
| 2008/0066020 | A1 | 3/2008 | Boss et al. |
| 2008/0077809 | A1* | 3/2008 | Hayler ................ G06F 12/1466 713/193 |
| 2008/0142599 | A1 | 6/2008 | Benillouche et al. |
| 2009/0006940 | A1* | 1/2009 | Hardt .................... G06F 17/243 715/224 |
| 2009/0044025 | A1 | 2/2009 | She |
| 2009/0046858 | A1 | 2/2009 | Iyer et al. |
| 2009/0132405 | A1* | 5/2009 | Scipioni et al. ................ 705/35 |

OTHER PUBLICATIONS

Search Report and Written Opinion for International Application No. PCT/US2010/046715, mailed Oct. 14, 2010, 13 pgs.

Ascendo et al. "Ascendo DataVault—BlackBerry Passwprd Manager Version 4 user guide" Oct. 2007, http://web.archive.org/web/2007102017534/http://ascendo-inc.com/UserGuides/DV/DV4UGContents.html.

Jeff Saporito, "Callpod Keeper Desktop", testfreaks blog, Jul. 31, 2009 http://blog.testfreaks.com/review/callpod-keeper-desktop/.

Michael Alexander, "Keeper: Encrypt the Data on Your iPhone", AppCraver, Feb. 24, 2009, http://www.appcraver.com/keeper/.

Jerry Bradenbaugh, "JavaScript Application Cookbook", O'Reilly Online catalog, Sep. 1999 http://web.archive.org/web/20000823053228/http://www.oreilly.com/catalog/jscook/chapter/ch09.html.

Mita et al. "Machine translation of JP 10-336167" http://dossier1.ipdl.inpit.go.jp/AIPN/odse_call_tranl.ipdl?N0000=7413&N0005=Ei7BzenZVnBvfz7D1ZIK&N0120=01&N2001=2&N3001=h10-336167&Ntt3=&Ntt4-&Ntt5=&Ntt6=&Ntt7=Ntt8=Ntt9=&Ntt10=&Ntt11=Ntt12=.

KeePass et al. "PasswordsRevisited—Using KeePass to Manage Your Financial Account Information" May 12, 2008, pp. 1-8, http//interestingmoney.com/2008/05/12/passwords-revisited-using-keepass-to-manage-your-financial-account-information/.

Beeken et al. Passwords Manager: KeePass Password Safe Review: Feb. 17, 2008, pp. 1-7 http://jlog.gen.ws/organize/keepass/.

AppDigity et al. "Keeper Password and Data Vault" Aug. 14, 2008, pp. 1-3 http://www.appdigity.com/pages/view_app.php?app_id=255.

* cited by examiner

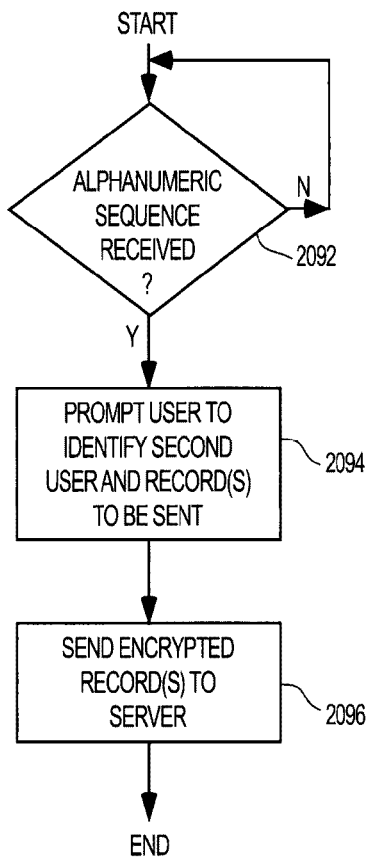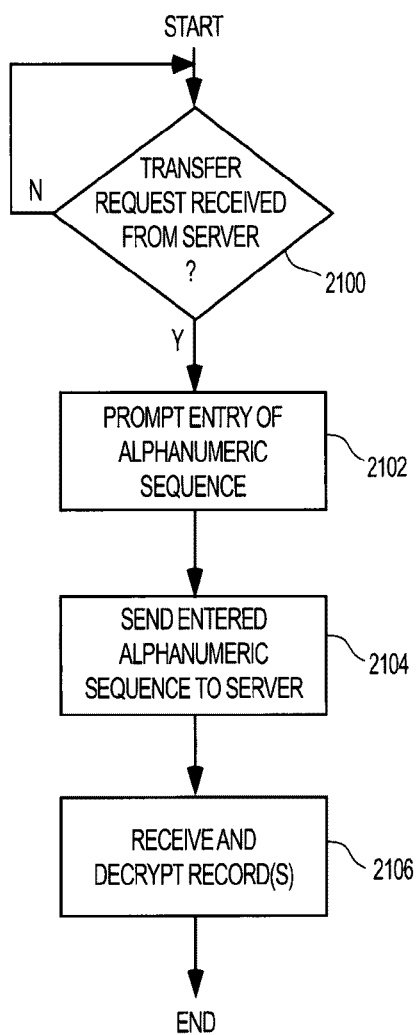

Fig. 23D

METHOD FOR FACILITATING QUICK LOGINS FROM A MOBILE DEVICE

REFERENCE TO RELATED APPLICATIONS

This application is a continuation-in-part of application Ser. No. 12/868,722, filed on Aug. 26, 2010, which is a continuation-in-part of application Ser. No. 12/546,881, filed Aug. 25, 2009, both of which are incorporated by reference herein in their entirety.

BACKGROUND

In recent years, the computing industry has seen many advances, such as producing a multitude of computing devices. These devices include, for example, mobile phones, personal digital assistants (PDAs), and the like. Additionally, these devices are programmed with Internet capabilities and access. Although these devices provide users with many modern options for communication, portability, and access to networked information (e.g., when connected to the Internet), many services on the Internet and access to native or local apps require that users input some private information, such as passwords.

The ways that passwords are entered vary greatly, depending on the type of services and/or depending on the type of device being used. For example, the ease of entering passwords on a computer is relatively uncomplicated, as most computers (e.g., desktops and laptops) have standard qwerty keyboards. With a standard qwerty keyboard, users are able to enter password key strokes without complication, even if the password data requires different combinations of user names, email addresses, and special letter and number combinations.

In recent years, users have been provided more computing power and network access on portable devices and non-traditional computing platforms. Although these devices may provide users with access to more information, these devices are not typically provided with standard size qwerty keyboards. Typically, mobile devices are provided with virtual keyboards on their space restricted screens for data entry. Moreover, in some instances, mobile phone users are required to typing word strings, characters and numbers using multiple key taps. By necessity, users are becoming familiar with multiple key tap entry, but even the most experienced uses of multiple key tap entry make mistakes and/or are required to reenter key taps until the correct data is entered.

Although possible to enter the data in this manner, as more services are made available to non-traditional computing devices, the need for more comprehensive access security for given services and data necessarily increases. Service providers have therefore established more rigorous password and authentication processes, which are designed to provide authorized use or access to sensitive data. These improved processes, however, also increases the complexity for entering the data on the multiple key tap pads (e.g., such as traditional mobile phones, personal digital assistances, etc. . . . ). As a result of having more rigorous passwords and authentication processes, users have become frustrated when attempting to access services for which they pay, and in some cases, users cancel services simply because access of the services is too cumbersome, time consuming or complex.

In view of the foregoing, there is a need for a method that enables users to easily and securely gain access to websites and native apps on mobile devices.

SUMMARY

According to one aspect, a computer-implemented method is provided for facilitating a quick login using a mobile computing device having a space-wise limited virtual keyboard. The method includes detecting a response from a server of a website or from an application native to the computing device that includes a login form displayed on a screen of the mobile computing device for authenticating a user, activating an application on the mobile computing device configured to fast fill the login form, and displaying a quick login keyboard, which includes a plurality of boxes configured to hold credential data of the user, wherein the quick login keyboard further includes a plurality of fill buttons, each of which is associated with one of the credential data boxes. The method further includes detecting a tapping on one of the plurality of fill buttons, and populating the login form with the credential data associated with the tapped fill button.

According to another aspect, the computer-implemented method includes detecting a tapping on a close button displayed on the quick login keyboard, displaying on the screen the dialog box that includes the plurality of keyboard selections, detecting a selection by the user of another one of the plurality of keyboard selections, which corresponds to a preferred keyboard by the user, based on the detected selection, replacing the quick login keyboard with the preferred keyboard.

According to yet another aspect, the computer-implemented method further includes determining that the login form is provided by a website for accessing particular services.

According to yet another aspect, a non-transitory computer-readable storage medium comprising programming instructions of the above-introduced method that are executable by a processor to facilitate a quick login using a mobile computing device having a space-wise limited virtual keyboard.

Other aspects of the present disclosure will be apparent upon review of the disclosure contained herein.

BRIEF DESCRIPTION OF THE DRAWINGS

FIG. 20 is a flow chart of programming executed by the system of FIG. 1 in response to actuation of a softkey of FIG. 19 that transmits records to a second user;

FIG. 21 is a flow chart of programming that may be executed by the system of FIG. 1 operating on a second user's device that permits the second user to receive records from the first user;

FIGS. 23A-23E is a sequence of exemplary screens provided by the installed Fast Fill application to help the user quickly login to a website or a native app;

DETAILED DESCRIPTION OF ILLUSTRATED EMBODIMENTS

Figure 1:
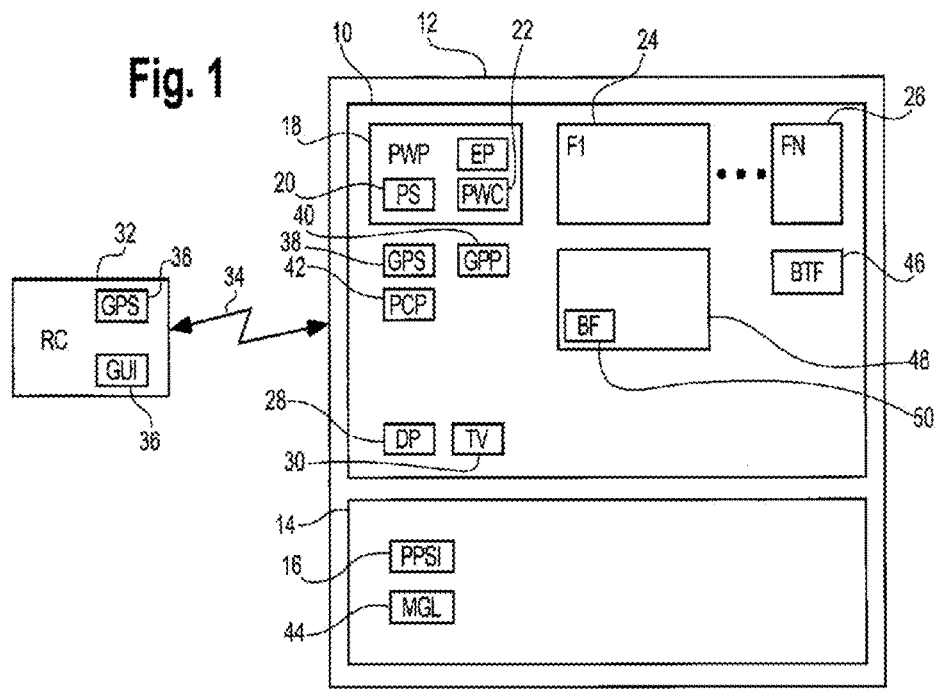
FIG. 1 is a block diagram of a password protection system 10 shown in a context of use generally in accordance with an illustrated embodiment of the present disclosure.

FIG. 1 is a block diagram of a password protection system 10 shown within a context of use generally in accordance with an illustrated embodiment of the present disclosure. The password protection system 10 may be used in conjunction with any of a number of portable electronic devices (e.g., an iPhone, PDA, portable computer, desktop computer etc.) 12 for convenient access to personal information in a safe, secure, portable environment.

Under the illustrated embodiment, a separate subject matter file may be created within the password protection system 10 for each unit of confidential information. For example, a first file may be provided for a VISA credit card, a second file may be provided for a MASTERCARD, a third file may be provided for bank or brokerage accounts, etc. Moreover, each file is not limited in the amount of information that may be used to define the unit of information.

Each file within the password protection system may be identified by a convenient title. In most cases, the title may be selected to be suggestive of the subject matter of the file. For example, a VISA file may be entitled "VISA."

Another file may be entitled "mortgages" as an indication of content. Within the file may be a name and account number of a mortgage holder. Alternatively, the content of the file may be a list of mortgage holders where a content of the list operate as pointers to other files that contain the specific account information of the mortgage holders in the list.

Moreover, the information contained within the password protection system 10 is intended to be automatically deleted upon the occurrence of any of a number of predetermined events. For example, entry of a sequence of incorrect passwords into the field intended for entry of a master password may cause deletion of all of the data within the password protection system 10 when the number of incorrect passwords in the sequence exceeds some predetermined value. Similarly, any attempt to copy the password protection system 10 or the encrypted files of the password protection system 10 may also automatically cause deletion.

Under another illustrated embodiment, the password protection system 10 may automatically offer information based upon geographic location. In this case, a user of the device 12 may mark certain geographic locations where certain units of confidential information are typically used. The next time that the user logs into the password protection system 10 at the marked location, the password protection system 10 automatically offers access to the marked information that corresponds to that geographic location.

The password protection system 10 may be used as an auxiliary application on any of a number of electronic devices 12 or as a single application on a stand-alone portable electronic device. For example, the password protection system 10 could be used as an application on an iPhone.

While the password protection system may have its greatest utility in small portable devices, the password protection system 10 may also be used in laptops and other desktop computer devices. For simplicity, the system 10 will first be described in the context of a laptop or desktop computer 12.

Figure 2:
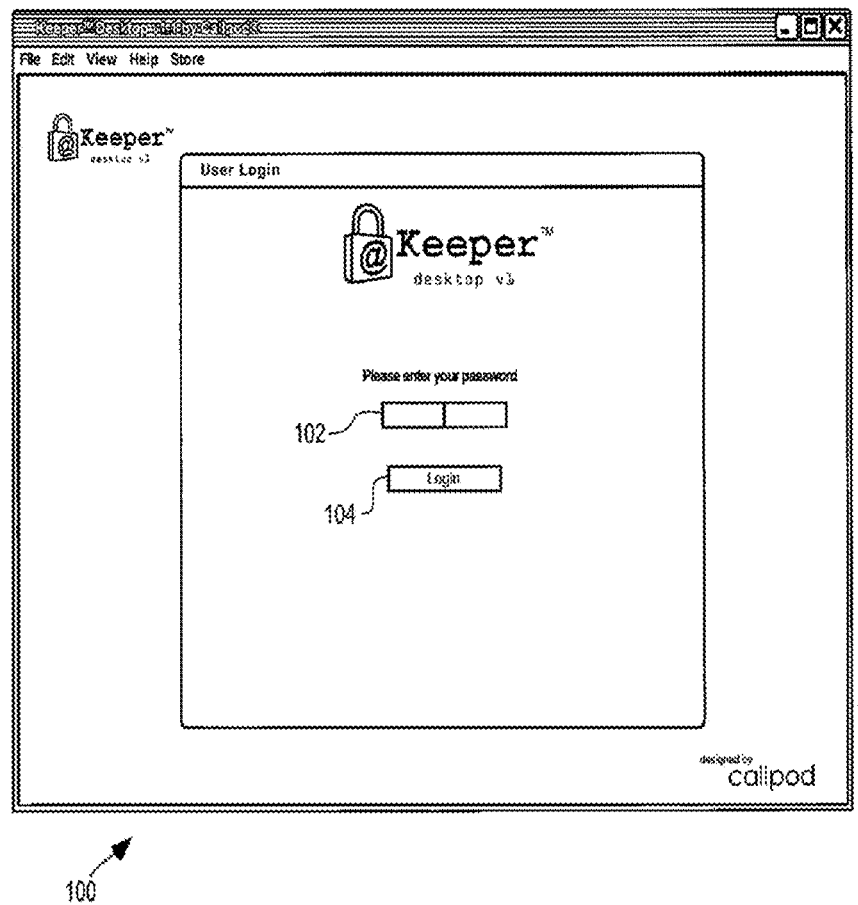
FIG. 2 is a master password entry screen that may be used by the system of FIG. 1.

In order to access the system 10, an access icon 16 of the password protection system 10 may be provided on a display 14 of the device 12. Upon selection of the icon 16, a sign on or login screen 100 (FIG. 2) may be presented to the user. Included within the sign on screen may be an interactive window 102 for entry of a master password. As used herein, a master password is an alphanumeric string used for gaining global access to the password protection system 10.

The master password may be any length up to 32 characters or longer in some cases. Any combination of letters or numbers may be combined depending upon the level of security needed.

Once presented with the interactive window for the master password, a user may enter the master password and activate an ENTER or LOGIN softkey 104. In response, a password processor 18 may compare the entered password with a previously saved master password 20.

If the password entered through the master password window 102 matches the saved master password 20, then access is granted to the subject matter files 24, 26 of the password protection system 10. For example, the window 200 of FIG. 3 may be presented to the user showing a list of titles 202.

On the other hand, if the entered password does not match the saved master password 20, then the password processor 18 increments a master password sequence counter or count register 22. Each time the entered password matches the saved master password 20, the password processor 18 resets (i.e., enters a zero value into) the master password sequence count register 22.

After each incorrect master password, the password processor 18 compares the value within the sequence count register 22 with a threshold value (e.g., a value of 5) 30. If the value within the count register 22 exceeds the threshold value 30, then the password processor 18 may activate a deletion processor 28. The deletion processor automatically and completely deletes each of the subject matter files 24, 26.

It should be specifically noted that the password protection system 10 does not provide any method for recovering or resetting forgotten master passwords. Moreover, if an unauthorized party should attempt to guess a password or use some computer controlled algorithm to match the master password, the automatic deletion of the subject matter files will defeat such attempt after a very limited number of tries.

Information saved within the system 10 may be encrypted using a public key and military specified encryption algorithm. In this regard, the public key and encryption algorithm operate on substantially all of the data within the system 10. On a first level, the master password is encrypted using the public key and encryption algorithm. Passwords entered through the password window 102 are encrypted and compared with the previously encrypted master password 20 during login. On another level, the subject matter files 24, 26 are further encrypted using the encrypted master password 20.

In a preferred embodiment, the password protection system 10 is protected by a one-way encryption system that encrypts the files with the master password and creates a first cryptographic hash from the master password and stores the first cryptographic hash with the files. A cryptographic hash function, such as MD5, may be used. The master password itself is not stored within the password protection system 10, but rather the first cryptographic hash is stored with the password protection system 10. To open the password protection system 10, an entry password is entered from which a second cryptographic hash is created using the same cryptographic hash function. If the first cryptographic hash and the second cryptographic hash match, then the user is allowed access into, or opens, the password protection system 10 and the entered (master) password is used to decrypt the individual files. The entered password is used as a symmetric key to decrypt the individual files. If the first cryptographic hash and the second cryptographic hash do not match (i.e., identifying the entered password as incorrect), and a predefined number of incorrect entry passwords are entered in succession, then the password protection system 10 automatically deletes all of the files.

Once a user opens the password protection system 10, the password processor decrypts the files 24, 26 and the user is presented with a navigation screen 200 containing the list of titles (alphanumeric sequences) 202 where each title corresponds to a respective file 24, 26. Each title of the list 202 presented on the navigation screen 200 operates as an access softkey for accessing a corresponding respective file 24, 26.

As opposed to scrolling through the list 202, the user may also search the files 24, 26. Included on the navigation screen may be an interactive window 204 for entering a search term. In this regard, the name and content of the files 24, 26 may be searchable. For example, if a user wishes to know if he/she has used the same term (e.g., title, password, etc.) for any other file, the user may enter the term, activate the ENTER button and the password system 10 will return an indication of any other files in which the term has been used.

Alternatively, the user may be provided with a "sort by" menu softkey 206. In this case, if the user selects "Sort by Title" and enters a letter, then the system 10 will return an alphabetic list of files 24, 26 that have a title beginning with the entered letter. Alternatively, the user may sort by oldest or youngest file 24, 26.

Associated with each of the files 24, 26 may be a number of information fields 208, 210, 212, 214 defined according to function. If the user wishes to retrieve a particular file 24, 26, then the user may select the corresponding title (e.g., title 302 in FIG. 4) from the list 202. Upon selection of the title 302, the user is presented with the information within each of the fields 208, 210, 212, 214.

Figure 4:
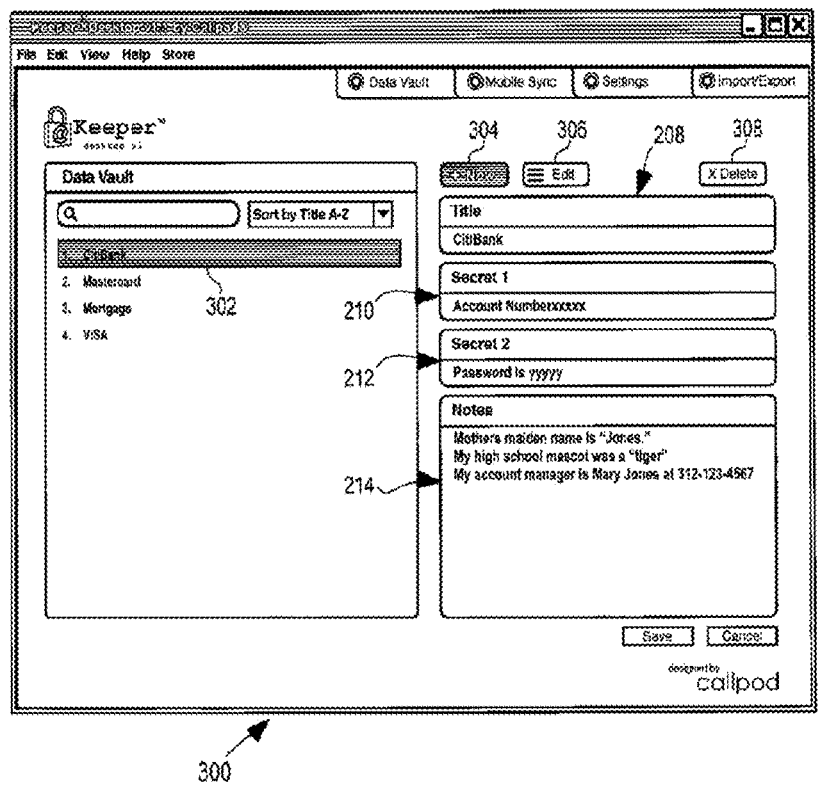
FIG. 4 is confidential information for a title selected by a user from the screen of FIG. 3.

In the example shown in FIG. 4, the user has selected the title "CitiBank" 302. In this case, the file 24, 26 contains information regarding a bank account with CitiBank. The title "CitiBank" is shown in the first field 208, the account number "xxxxx" is shown in the second field 210 as the first secret item, the password "yyyyy" is shown as the second secret item in the third field 212.

Also shown in FIG. 4 is a fourth field 214 labeled "Notes." Within the Notes field 214, the user may enter any information used in conjunction with the account. In this case, the user may enter the answers to the personal questions asked by the bank in setting up the account. In this case, the answers to the personal questions may be used by the bank to confirm the identity of the user in any of a variety of different situations (e.g., on-line transactions, telephone requests, etc.).

In addition to retrieving information, the user can also easily modify the records 24, 26 within the system 10. For example, if the user should want to change a password saved in the second field or window 212 of the screen 300, then the user may activate an Edit softkey 306. Once the Edit softkey 306 has been activated, the user can place a cursor over the information of the fields 208, 210, 212, 214 and enter changes.

Similarly, if the user should wish to create an entry for a new account (i.e., create a new file 24, 26), the user may activate the New softkey 304. Once the New softkey 304 is activated, the user can add files 24, 26 as necessary by typing a title into the first window 208 followed by additional information into the following windows 210, 212, 214.

If the user should find that certain information has become outdated or may be replaced by other information, the user can delete the appropriate files 24, 26. In this case, the user simply selects the title of a file 24, 26 and activates the Delete softkey 308.

Figure 3:
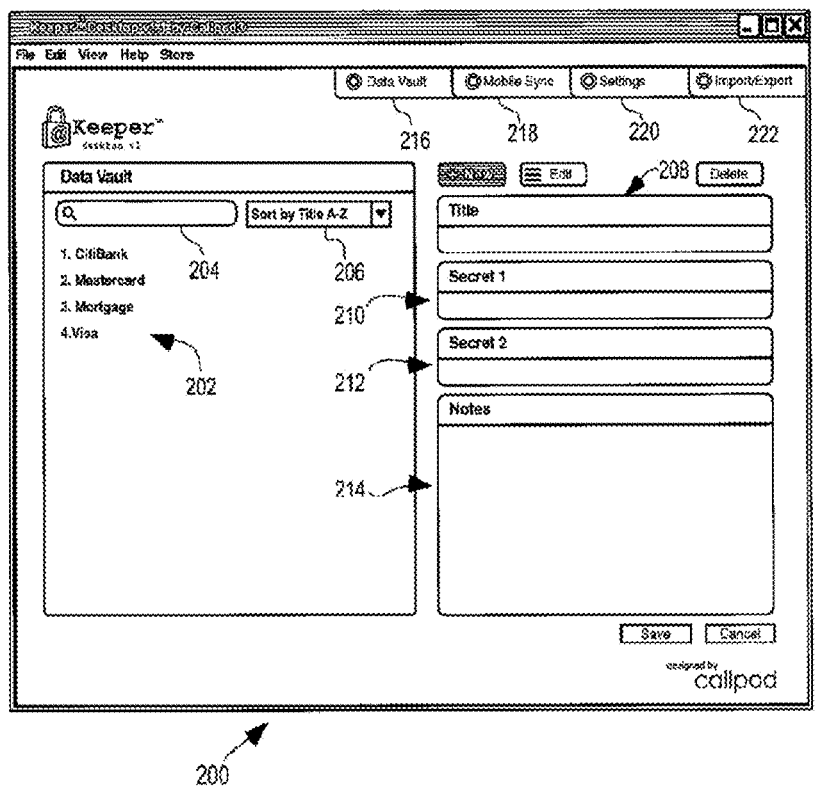
FIG. 3 is a title selection list screen of confidential information that may be displayed by the system of FIG. 1.

Similarly, the system 10 can be adapted to any of a number of different uses. For example, if the user should wish to change the user interface of the system 10, then the user may activate the Settings softkey 220 (FIG. 3).

Figure 5:
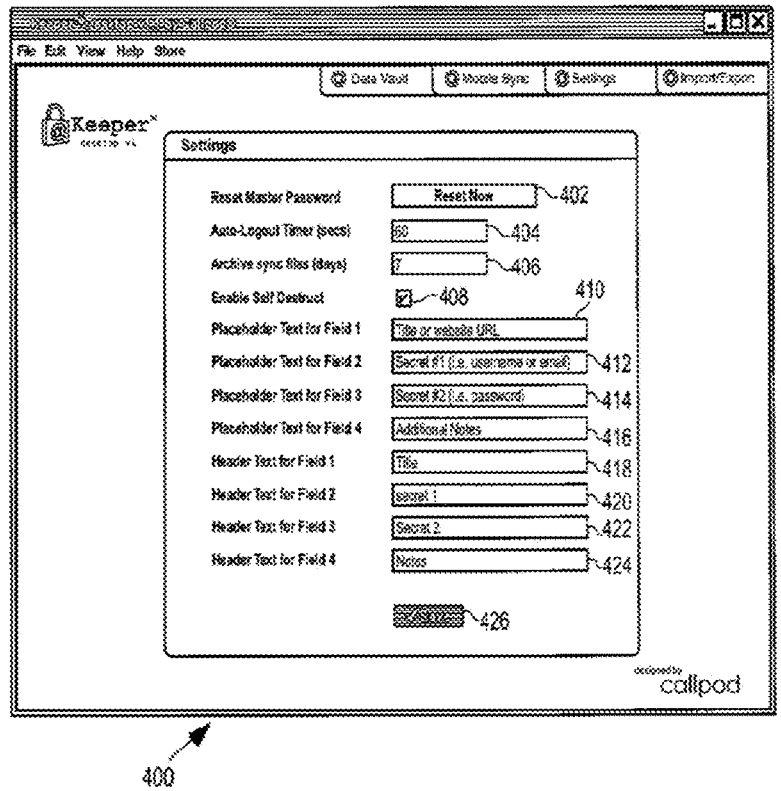
FIG. 5 is a settings screen that may be selected by a user through the screens of FIG. 3 or 4.

Upon activating the Settings softkey 220, the user is presented with the settings screen 400 of FIG. 5. A first choice of the settings screen 400 is a Reset Master Password softkey 402. The Reset softkey 402 resets the master password 20.

In order to reset the master password 20, the password processor 18 first decrypts each of the files 24, 26 using the old encrypted master password 20. The password processor 18 then requires that the user enter a new master password a first and then a second time. If the two newly entered passwords match then the password processor first encrypts the new master password 20 and then re-encrypts each of the files 24, 26.

Another choice on the setting screen 400 is a window 404 for entering a time delay controlling automatic logout. In this case, a timer within the system 10 is initiated each time the user logs in. When the timer reaches the time value shown in the window 404 (or reaches zero from a starting value equal to the time shown in the window 404), the system 10 automatically logs the user out of the system 10. The logout in this case may be set to a relatively short period of time to further protect the files 24, 26 by automatically requiring the user to re-enter the master password each time the time period 404 elapses.

Another choice on the settings screen 400 is a window 406 for specifying a time interval for backing up or otherwise archiving the files 24, 26 in a memory device. In this case, the specified time is in days. After the expiration of the time period specified in the window 406, the user is prompted to synchronize the files 24, 26.

Another choice on the settings screen 400 is a box 408 for enabling or disabling the automatic deletion of the files 24, 26. If the box 408 is checked, then after a specified sequence of incorrect master passwords are entered, the files 24, 26 are automatically deleted. If the box 408 is not checked, then the system 10 will not delete the files 24, 26. However, the system 10 will continue to deny access until the proper master password is entered.

Other choices include a number of windows 410, 412, 414, 416, 418, 420, 422, 424 that may be used in conjunction with the "New" softkey 304 and with the creation of new files 24, 26. For example, boxes 418, 420, 422, 424 are used for entering the terms that will appear in the upper halves of fields 208, 210, 212, 214. Boxes 410, 412, 414, 416 are used for entry of placeholder terms that are initially displayed in the lower halves of fields 208, 210, 212, 214 and that are replaced with the actual information entered by the user. For example, a first box 418 may be used for entry of header text (e.g., the word "title") or other descriptive term in the upper portion of field 208 for each of the files 24, 26. In the example, of FIG. 5, the placeholder for the header text entered through box 410 is descriptive of the format of the header text, including an identifier of a bank or credit account or the name of a website.

Similarly, a second box 420 and third box 422 may be used for entry of descriptive header text displayed in the top halves of the second and third fields 210, 212, respectively, while boxes 412, 414 receive descriptive placeholder information of the format of user information that may be entered into the lower halves of the second and third fields 210, 212. For example, box 420 may have the title of "secret 1" in the top half of field 210 while the placeholder entered through box 412 may be "Secret #1 (i.e., username or email)." Similarly, box 422 may have the title of "secret 2" in the top half of field 212 while the placeholder entered through box 414 may be "Secret #2 (i.e., password)." Box 424 may have the header text of "Notes" in the top half of field 214 while the placeholder entered through box 416 may be "Additional Notes." The user may make whatever setting changes desired and activate a Save softkey 426 to save the desired settings.

Figure 6:
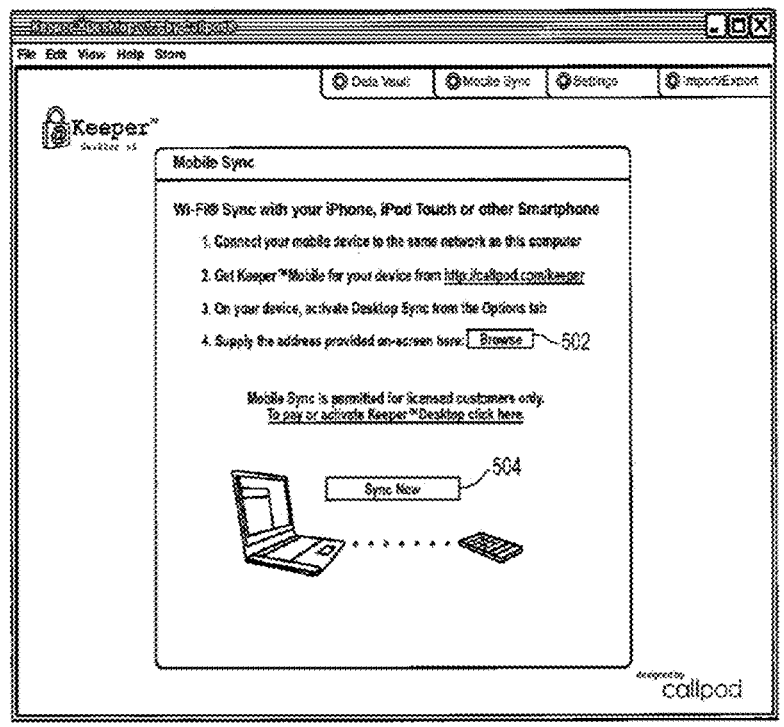
FIG. 6 is a synchronization screen that may be selected by a user through the screens of FIGS. 3-5.

If the user should select the Mobile Sync softkey 218 (FIG. 3), then the user may be presented with the screen 500 of FIG. 6. The Mobile Sync softkey 218 operates to synchronize data or otherwise exchange updates between the laptop 12 and mobile device 32.

In order to synchronize data, the user first provides an appropriate software version of the system 10 to the mobile device 32 and connects the mobile device 32 to the same network as the laptop 12. In this regard, the connection may be established via any appropriate medium (e.g., WiFi, USB cable, Bluetooth, etc.). In the example of FIG. 1, the laptop 12 is connected to the mobile device 32 via a WiFi connection 34.

To initiate synchronization, the user activates Mobile Sync softkey 218 (if not already activated). From the screen 500, the user may select the communication system via a Browse softkey 502. In the example of FIG. 1, the user would select the WiFi connection 34. Once the communication connection 34 has been selected, the user activates the Sync Now softkey 504 to synchronize files 24, 26 among devices 12, 32.

Figure 7:
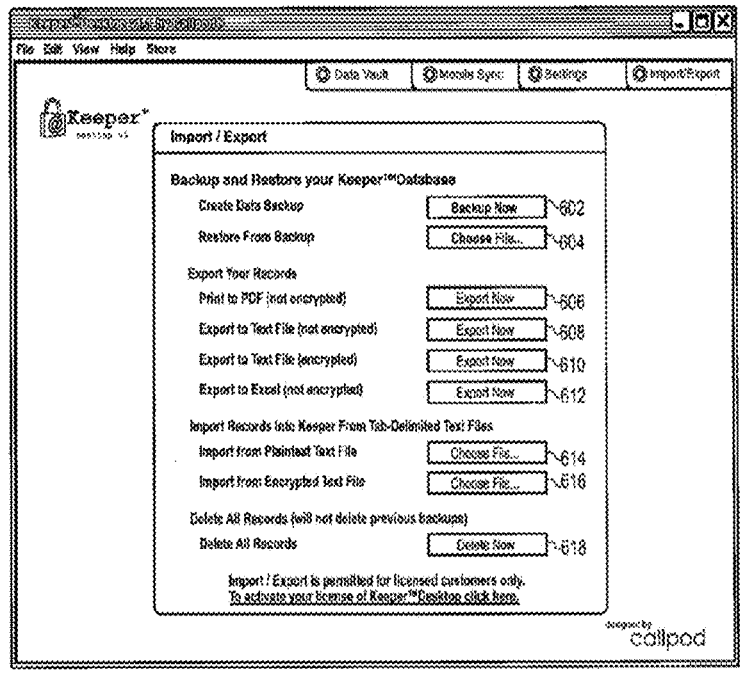
FIG. 7 is an Import/Export screen that may be selected by a user through the screens of FIGS. 3-6.

In addition to synchronizing files 24, 26, the user may also archive the files 24, 26. In this case, the user may activate an Import/Export softkey 222 (FIG. 3). In response, the screen of FIG. 7 may be presented to the user.

If the user has not previously backed up the files, then the user may activate the Backup Now softkey 602. In response, the user would be presented with a proposed path/file name for backup. The user may either activate an OK softkey or modify the proposed path/file name and then activate the OK softkey to complete the backup.

Alternatively, the user may restore a previous set of files 24, 26 by activating a Choose File softkey 604. In response, the user may be presented with one or more previously created backup file(s). The user may select one of the files followed by activation of an OK softkey completing the restore operation.

The user may also export the files 24, 26 either in an encrypted ou unencrypted format. For example, a user may export the files 24, 26 under an unencrypted pdf format by activating an Export Now softkey 606. In response, the user would be presented with an interactive window for entry of a path/filename. The user may select a path, enter a file name and activate an OK softkey to complete exportation into the unencrypted pdf file.

Similarly, the user may export the files 24, 26 under an unencrypted text format by activating an Export Now softkey 608. In response, the user would be presented with an interactive window for entry of a path/filename. The user may select a path, enter a file name and activate an OK softkey to complete exportation into the unencrypted text file.

Alternatively, the user may export the files 24, 26 under an encrypted text format by activating an Export Now softkey 610. In response, the user would be presented with an interactive window for entry of a path/filename. The user may select a path, enter a file name and activate an OK softkey to complete exportation into the encrypted text file.

In another alternative, the user may export the files 24, 26 under an unencrypted Excel format by activating an Export Now softkey 612. In response, the user would be presented with an interactive window for entry of a path/filename. The user may select a path, enter a file name and activate an OK softkey to complete exportation into the unencrypted Excel file.

The user may also import files from one or more tab-delimited text files having the appropriate format. In this case, the user may import from a plaintext text file by activating a Choose File softkey 614. In response, the user would be presented with a Browse softkey where the user would select the appropriate text file. The user may then activate an OK softkey to complete the importation.

The user may also import files from one or more text files having the appropriate encrypted format. In this case, the user may import from an encrypted plaintext text file by activating a Choose File softkey 616. In response, the user would be presented with a Browse softkey where the user would select the appropriate encrypted text file. The user may then activate an OK softkey to complete the importation.

The user may also delete all files 24, 26 within the system 10 by activating the Delete Now softkey 618. Activation of this softkey 618 will not affect previous backups of the files 24, 26.

Under another illustrated embodiment, the system 10 includes (or accesses) a global positioning system (UPS) sensor 38. Each time that the user opens a particular file 24, 26, the GPS sensor 38 may determine a current global position (e.g., by street address, latitude and longitude, etc.) of the device 12, 32 and a global positioning processor 40 saves the global position within the file 24, 26. If the file 24, 26 already contains a record of the current global position, then the global positioning processor may increment the number of times that the file 24, 26 has been opened at the current position. Alternatively, a user may activate a Mark Global Position softkey 44 to mark a particular location of use of the file 24, 26.

The collection of geographic information may be very useful in some situations. For example, where a user enters a bank or stock broker's office, it is very likely that the user will need access to any files 24, 26 containing secret information related to one or more accounts the user has previously established with the bank or broker.

Operating in the background on the system 10 may be a position comparison processor 42 that determines a current global position of the system 10 each time that the user logs into the system 10 or periodically after login. A comparator within the position comparison processor 42 then looks for any marked files 24, 26 or compares the current global position with any global positions saved within each of the files 24, 26 to identify any files 24, 26 that are frequently used at the current geographic location. The position comparison processor 42 may do this by comparing the number of times that a file was opened at a current location with a threshold value used to eliminate random events. The position comparison processor 42 may then order any remaining files based upon which file 24, 26 was opened most frequently at the current location and proceed to present the ordered list to the user. The user may open the most frequently used file 24, 26, scroll through the list or open none at all.

In general, the system 10 operates substantially the same on the mobile unit 32 as on the laptop or desktop device 12. One exception is the graphical user interface (GUI) 14. For example, where the system 10 is installed into an iPhone, the GUI 36 of the mobile unit 32 would appear somewhat different than when used on the laptop 12.

Figure 8:
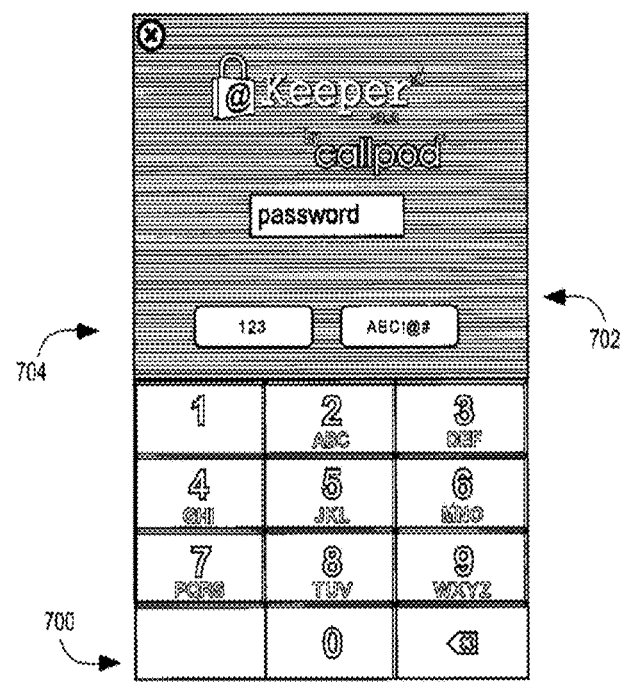
FIG. 8 is a master password entry screen of a portable device that may be used by the system of FIG. 1.

For example, to access the system 10, the user would activate the password protection system icon 16 on the mobile device 32. In response, the login screen 700 of FIG. 8 would appear on the GUI 36 of the mobile device 32.

Using the screen 700, the user would log into the system 10. For a master password including numbers, the user would activate the number softkey 704 for entering numbers. For letters, the user would activate the alphabetic softkey 702 and be presented with a full alphabetic keyboard instead of the number keyboard shown on screen 700.

Figure 9:
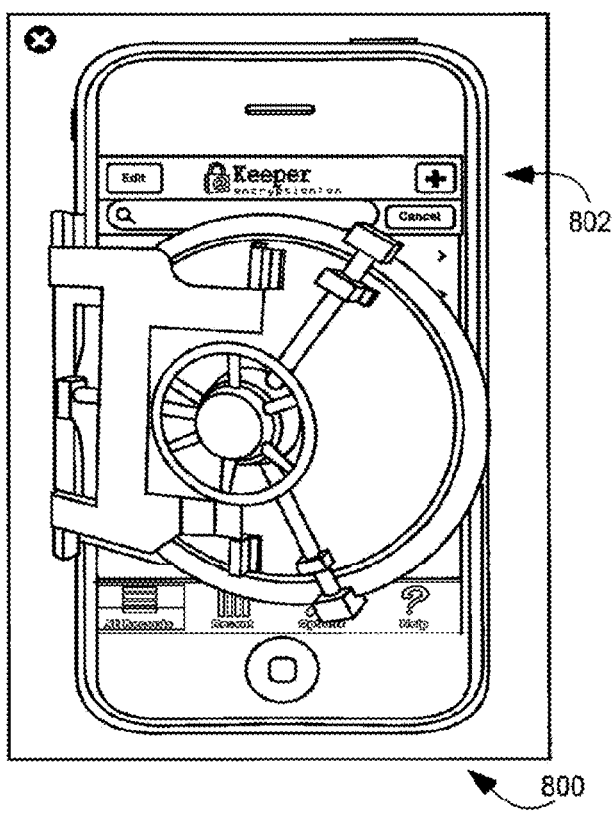
FIG. 9 is an introductory title list screen of a portable device that may be used with the system of FIG. 1.

Upon the successful entry of a master password, the screen 800 of FIG. 9 would appear on the mobile device 32. In order to access the records 24, 26, the user may activate an advance softkey 802.

Figure 10:
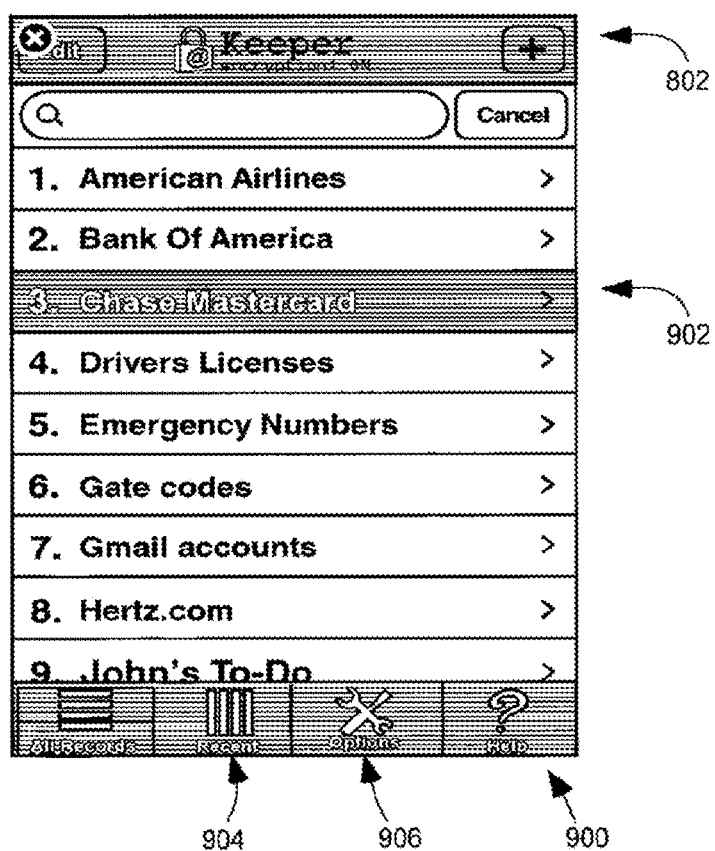
FIG. 10 is a selection list screen of confidential information of a portable device that may be displayed by the system of FIG. 1.

Upon activating the advance softkey 802, the user may be presented with the screen 900 of FIG. 10 showing a list of titles 202. If the user does not see the title that he/she wants, then the user may continue to activate the advance softkey 802. Alternatively, the user may activate a most recently accessed softkey 904 to view a set of most recently displayed records 24, 26.

Figure 11:
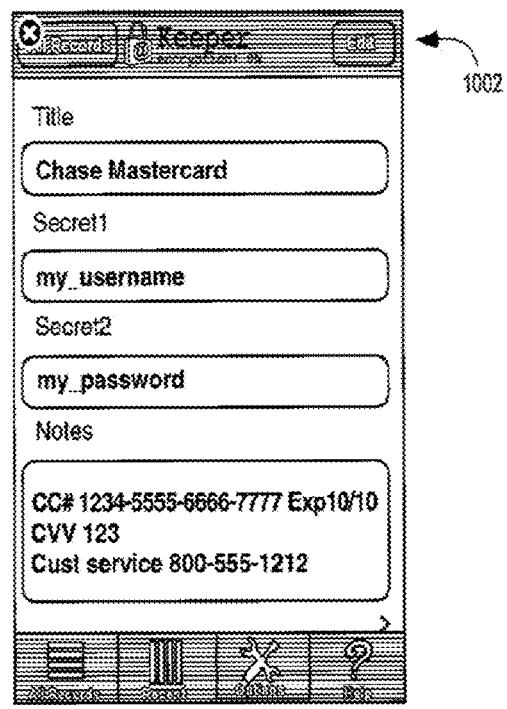
FIG. 11 is an information screen of a portable device that may be selected through the screen of FIG. 10.

Alternatively, the user may select one of the titles (e.g., title 902 of FIG. 10). Upon activating the title 902, the user would be taken to the screen 1000 of FIG. 11.

The user may review and use the information on the screen 1000 or may decide that the information needs to be updated. If the user desires to update the screen 1000, then the user activates the Edit softkey 1002 and is taken to the screen 1100 of FIG. 12.

Figure 12:
FIG. 12 is an edit screen that may be selected through the screen of FIG. 11.

On the screen 1100 of FIG. 12, the user may place a cursor 1102 where ever desired and make corrections. Once the corrections are complete, the user may activate the Save softkey 1104. Alternatively, the user may activate the Cancel softkey 1106 or Close softkey 1108 to cancel the corrections. If the user activates the Close softkey 1108, then the system 10 would close and the user would be required to activate the system icon 16 to login and continue use of the system 10.

Figure 13:
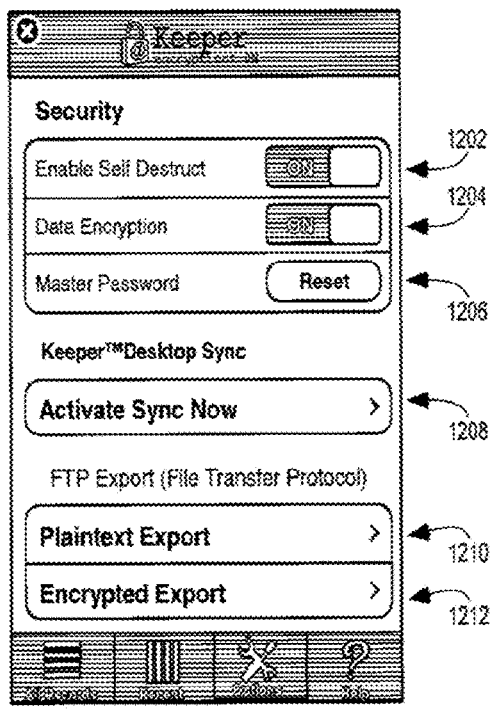
FIG. 13 is a synchronization screen that may be selected through the screens of FIGS. 9-12.

If the user chooses to activate the Save softkey 1104 or Cancel softkey 1106, then the user may be taken back to the title list of screen 900. From the title list of screen 900, the user may activate an Options softkey 906 and be presented with the tools screen 1200 of FIG. 13.

On the tools screen 1200, the user may activate the Enable Self Destruct softkey switch 1202 to enable the automatic deletion of records 24, 26 upon the entry of a sequence of incorrect master password a predetermined number of times. Alternatively, the user may activate a Data Encryption softkey switch 1204 to encrypt the files 24, 26 and master password saved on the mobile device 32. The user may also activate a Master Password Reset softkey 1206 to reset the master password.

The user may also initiate a synchronization procedure through the Activate Sync Now softkey 1208. The user may also specify the format of synchronization by selecting either a Plaintext Export softkey 1210 or an Encrypted Export softkey 1212.

If the user activates the Activate Sync Now softkey 1208, the user may be asked to activate a further softkey switch to confirm his/her desire to synchronize with the laptop 12. If the user confirms, his/her desire to continue, then the mobile device presents an address for use with and entry into the laptop in order to facilitate synchronization. Once complete, the mobile device presents a screen to the user confirming the successful synchronization of the mobile device 32.

In another embodiment of the present disclosure, the password processor 18 may compare any entered password with a booby trap password 46. The use of a booby trap password 46 may be useful in cases where the user of the system is under duress. For example, a user on a public street may be threatened with harm if the user does not provide a thief with the master password. In this case, the booby trap password 46 may be a password that instead of providing access to the files operates to immediately delete the files 20, 26.

As above, the booby trap password 46 may be encrypted using a public key and the booby trap password 46 and saved as an encrypted booby trap file 48. Any entered password may be used to decrypt the file 48. If the entered password successfully decrypts the file 48, the deletion processor 28 may be immediately activated to delete the files 24, 26.

In still another embodiment, the successful decryption of the booby trap file 50 may result in a series of steps intended to confound a threat. In this case, the successful decryption of the booby trap file 48 may cause a set of bogus information from a file 50 to be displayed on the screen including a set of bogus passwords or passwords that if used by the threat would immediately cause an alert to be sent to the authorities.

Figure 14:
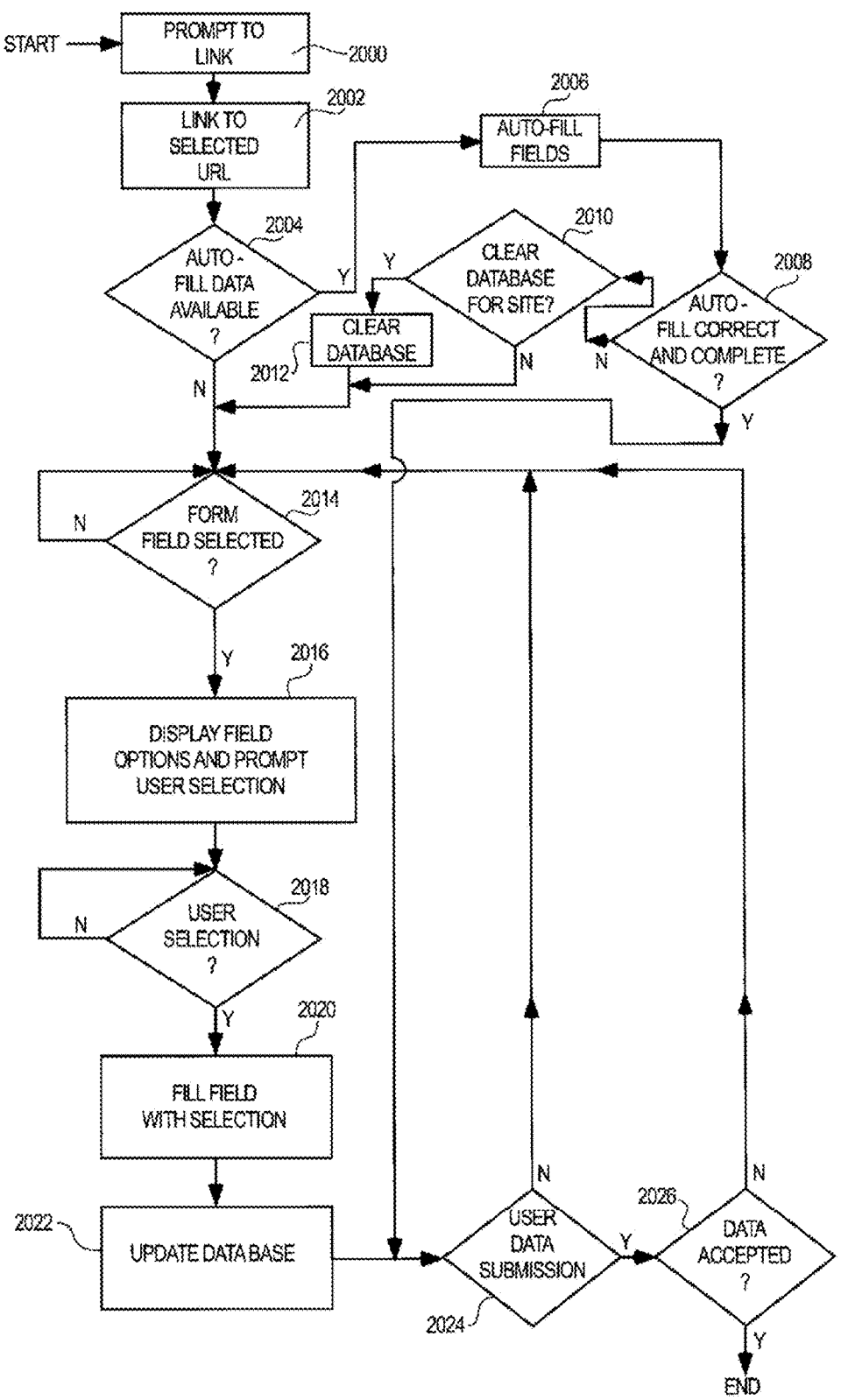
FIG. 14 is a flow chart illustrating optional programming executed by the password protection system 10 according to a further embodiment of the present disclosure.
Figure 14A:
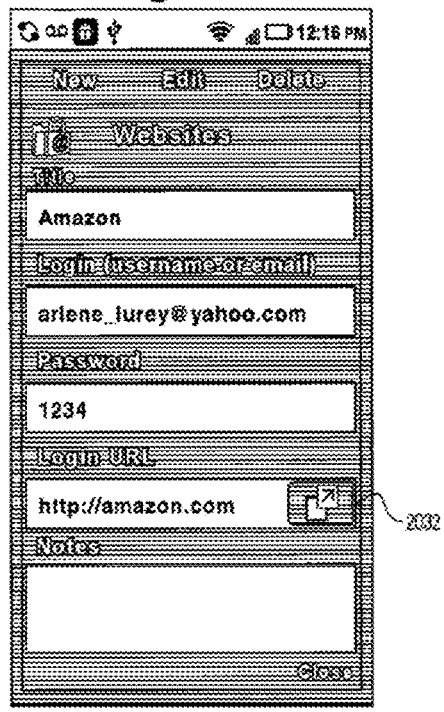
FIGS. 14A-14C are screenshots of screens presented to a user associated with the programming of FIG. 14.

FIG. 14 illustrates programming that may be executed by the system 10 to implement an auto-fill function. When a user creates a password record using the system 10, one of the fields that the user can fill in is called the "link" field. This link is a URL of the website for which the password was created. For example, it could be their banking website (e.g., http://www.bankofamerica.com) or shopping site (such as: http://www.amazon.com).

When the user views his/her password record, he/she is prompted with the ability to open the displayed link on a web browser of their device. When the browser opens, the system 10 scans the content of the pages as the user navigates. When the user selects a form field (e.g., a username, password, or email box) of the website's page, the system 10 prompts the user to indicate whether the system 10 should automatically fill in the field. The user is prompted with options of what to insert (i.e. username, password, email, or other field) and the user selects one of the proffered options. The system 10 fills in the form field in response to the selection. The user repeats this process until all the form fields are filled out satisfactorily and the user submits the form to the website, hence performing a login or other action.

The system 10 remembers which fields of the system database were utilized for which website fields. The next time the user launches the website from the system 10, the system 10 auto-fills the information, thereby allowing the user to quickly log into the particular site. The user may also clear the mappings if the site has changed or new fields are required.

Figure 14B:
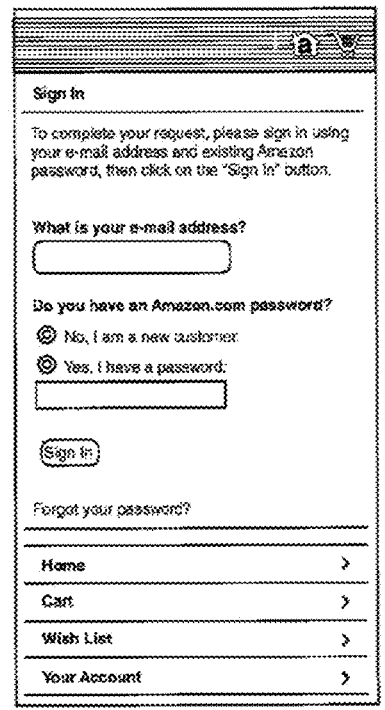
Figure 14C:
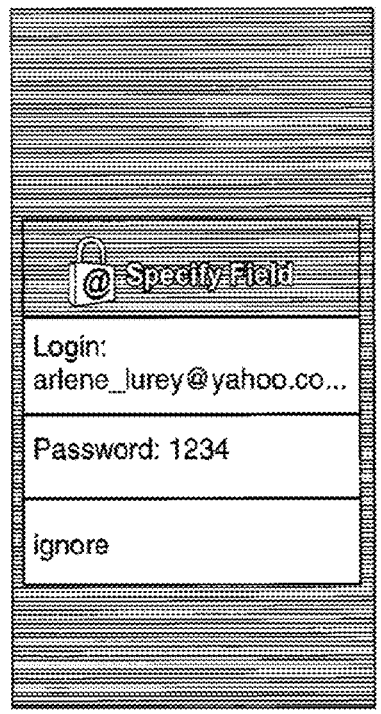

Referring to FIG. 14, the programming begins at a block 2000 that prompts the user to select the link associated with the record that is currently being viewed. Once the user has selected the link, a block 2002 causes the browser to link to the selected URL. For example, a screen 2030 is presented to the user, which includes a soft key 2032 that, when selected, activates the block 2002, which then causes the web site to be presented to the user on screen 2034, as shown in FIG. 14B. At this point the system 10 continues to run in the background although the web site is also shown on the screen 2034. A block 2004 then determines whether data are available in the database of the system 10 to perform the auto-fill function. If such data are available, a block 2006 performs the auto-fill function whereby database entries are correspondingly loaded into website form fields, as shown in screenshot 2036 of FIG. 14C. A block 2008 then checks to determine whether the auto-fill operation has resulted in a correct and completed website page. If this is not found to be the case, a block 2010 queries the user to determine whether the database entries associated with the site should be cleared from the database. If the user responds that the database data should be cleared from the system 10, a block 2012 deletes the entries in the database record and control passes to a block 2014. On the other hand, if the block 2010 determines that the user desires not to clear the data in the database, the block 2012 is skipped.

Following the block 2004 or the blocks 2010 or 2012, the block 2014 checks to determine whether the user has selected a field on the website form. If this is not found to be the case, control pauses until a field is selected. Once this is detected, a block 2016 displays options for the field and prompts the user to select one of the options. Control then pauses at a block 2018 until the user selects one of the options for insertion. A block 2020 then fills the selected field with data representing the selected option. Thereafter, a block 2022 updates the system database with the selected option data and associates such data with the form fields at which the data were inserted.

Following the block 2022, a block 2024 checks to determine whether the user has activated a data submission softkey requesting that the filled-in form be submitted to the website. Ordinarily, this action would not be requested until all form fields have been filled in successfully. If the user has not pressed the submission softkey, control returns to the block 2014 where the user can select a new form field. On the other hand, if the user has pressed the submission softkey, the data in the form fields are submitted to the website. A block 2026 thereafter checks to determine whether the website has accepted the filled-in webpage. If this is not found to be the case, control returns to the block 2014 so that the user may enter more data. If the filled-in webpage has been accepted by the website, this portion of the programming terminates.

Figure 15:
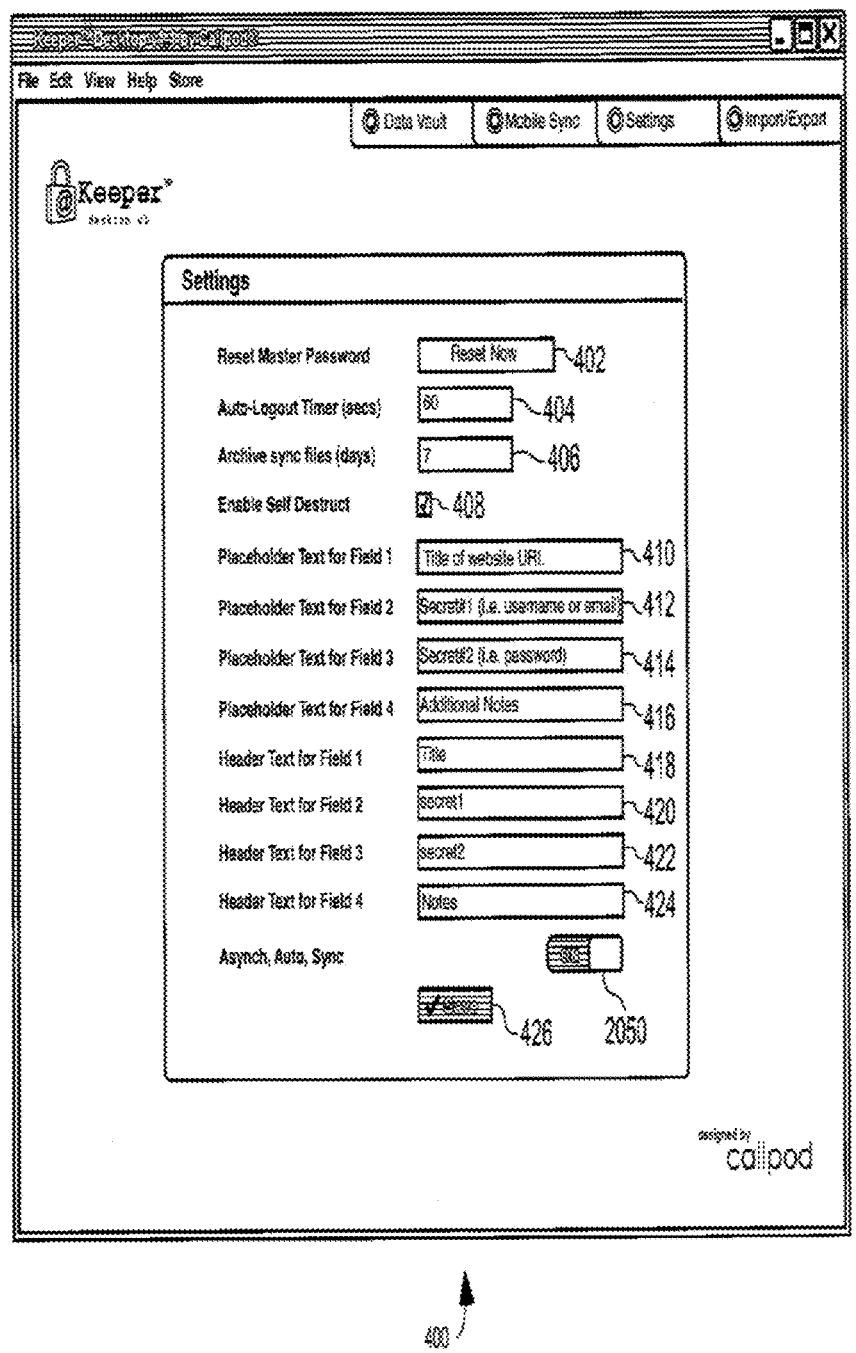
FIG. 15 is an alternative settings screen similar to FIG. 5 that permits selection of settings, including an asynchronous auto-sync function, for the system of FIG. 1.

FIG. 15 illustrates an alternative settings screen that can permit a user to select or deselect an asynchronous auto synchronization function. In general, a user requires his/her password information to be available and accessible on any computer or mobile device that he/she utilizes. The information must be kept up-to-date and in sync whenever the user changes or adds new information on any device. When a user signs up with the system 10, the user is provided a "subscription code," which is a unique alphanumeric sequence that only applies to the user. This code is typed into each location that the software is installed along with a device id that uniquely identifies each device on which the system 10 is installed. When validated by the activation server, this information uniquely defines a user and a device.

The process of automatically synchronizing the user's password information should be kept simple and easy, and therefore, there should not be any configuration or complex device authentication.

An on/off switch 2050, seen in FIG. 15, is optionally provided to the user on the Settings screen of the application. This switch, when turned ON, will cause the application to contact a database of a central server where an encrypted copy of the user's data is uploaded upon every instance of the application opening, or on a periodicity defined by the user. The data are encrypted utilizing the user's master password and subscription code as the cipher. Using this cipher ensures that a brute force attack on the data is not feasible.

When the data are uploaded to the central server, a synchronization operation is performed on the server side, based on the previously uploaded data having the same subscription code and cipher keys (if such data exists). The resulting database is then downloaded by the user's application and overrides the user's current database. By maintaining a copy of the most recently merged database on the server side, the user is able to perform asynchronous auto-sync of his/her information across mobile devices and computer(s).

It should be noted that a synchronization operation cannot take place if the subscription code and master password do not form a cipher that properly decrypts the data.

Figure 15A:
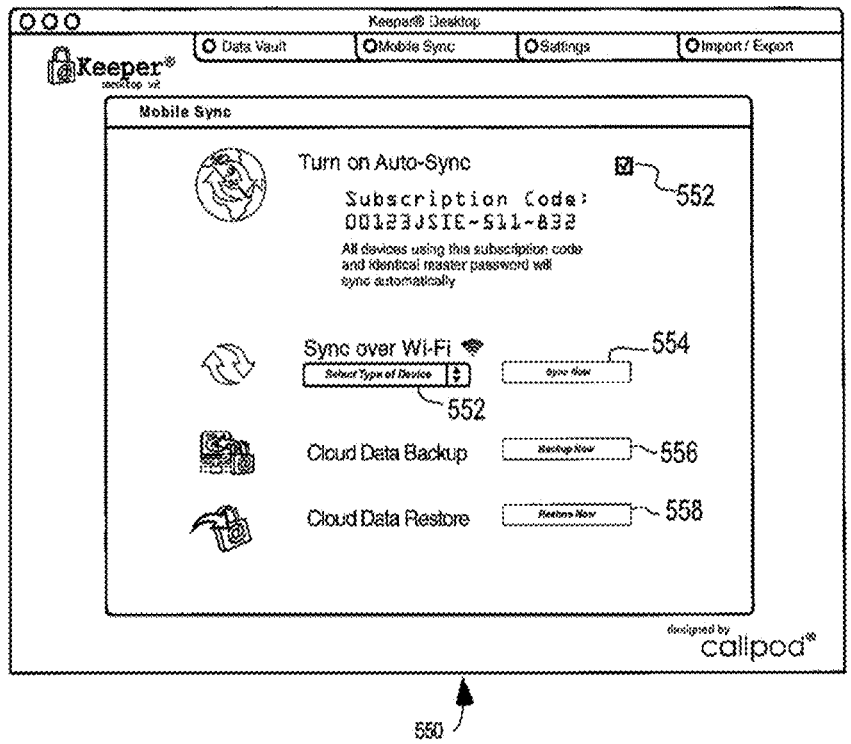
FIGS. 15A-15H are screen shots of alternative screens presented to user for an alternative method of implementing synchronization and database backup routines.
Figure 15B:
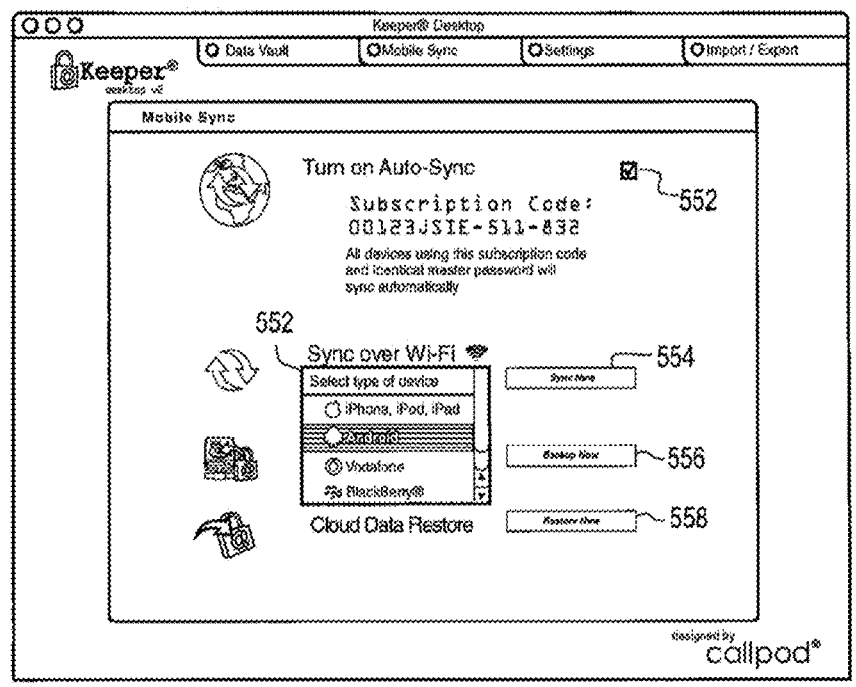

In another embodiment of such a server-based system, synchronization and data backup routines may also be accessed with a screen 550 shown in FIGS. 15A and 15B may be presented to the user as an alternative to the screen 400 shown in FIG. 15 or the screen 500 in FIG. 6.

In this embodiment, any one of the electronic devices may automatically synch with the other electronic devices via the remote server. An on/off check box 552 is displayed on the screen 550, wherein if the checkbox is selected "on," then the system will automatically synchronized the data stored on each electronic device connected to the remote server when a given event occurs. For example, the auto synchronization may be set to occur any time new data is entered into a database and any time existing data is modified on a database on any one of the electronic devices, and/or whenever the system 10 is accessed. Thereby, if a file record 24, 26 is created or altered on one electronic device, then that electronic device will send the new/altered information to the server, which will in turn relay the new/altered information to some or all of the other electronic devices.

The electronic devices may also be synchronized manually over a local area network, such as a local WIFI network. Manual synchronization may be initiated with a dropdown menu 652 associated with a softkey 654 for accessing a synchronization routine. As shown in FIG. 15B, the dropdown menu presents a list of choices of what type of device the user wishes to synchronize with. For example, the user may choose to synchronize with an Android-type of smart phone as shown in FIG. 15B. Of, the user could choose other types of electronic devices depending upon what types of devices with which he or she needs to synchronize. Additionally, manual synchronization may optionally be directed to a particular one of several different electronic devices, in which case an additional data entry feature may be provided to the user to provide identifying information for which of the several electronic devices he or she wants to synchronize. After the device has been selected and/or identified, the user selects the softkey 554 to initiate a synchronization routine over the LAN.

Such a server-based system may also include data backup and restore features that backup to and restore from the remote server, wherein file records 24, 26 on an electronic device are backed up by copying the file records to memory on the remote server and such backed-up file records may be restored to any one of the electronic devices. Such back-up and restore functionality to a remote server may be called cloud data backup and cloud data restore. A softkey 556 initiates a cloud backup routine, and a softkey 558 initiates a cloud restoration routine.

Figure 15C:
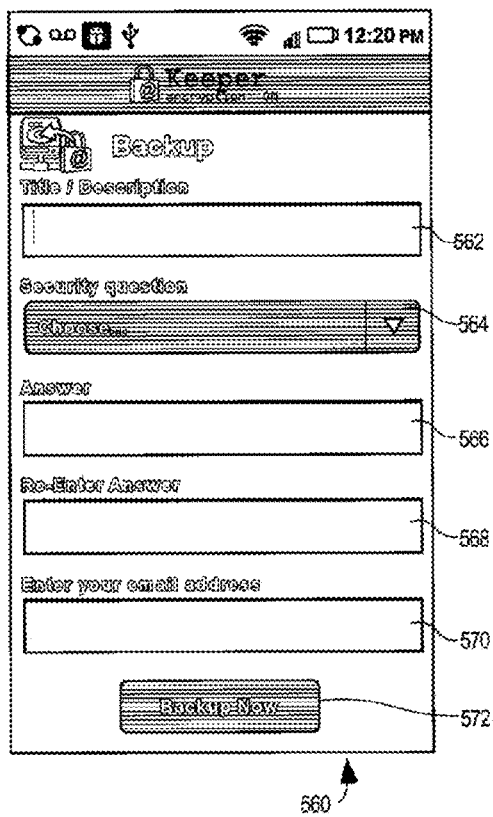

Upon selecting the softkey 556, a screen 560 (FIG. 15C) is presented to the user. The user enters a title for a backup file to be created in a data entry box 562, such as "phone." The user selects a security question from a dropdown box 564. For example, the security question may be "what is the current keeper master password?" The user enters the answer to the security question in a data entry box 566, and re-enters the answer in the data entry box 568 for confirmation. The user also enters his or her email address in the data entry box 570. Thereafter, the user selects a softkey 572 to initiate the cloud backup routine, which creates and stores an encrypted backup file on the remote server under the title entered by the user in the data entry box 562. The backup file is encrypted utilizing a cipher based on the email address, the security question, and the security answer entered by the user. This prevents unauthorized access to the backup file by anyone.

Figure 15D:
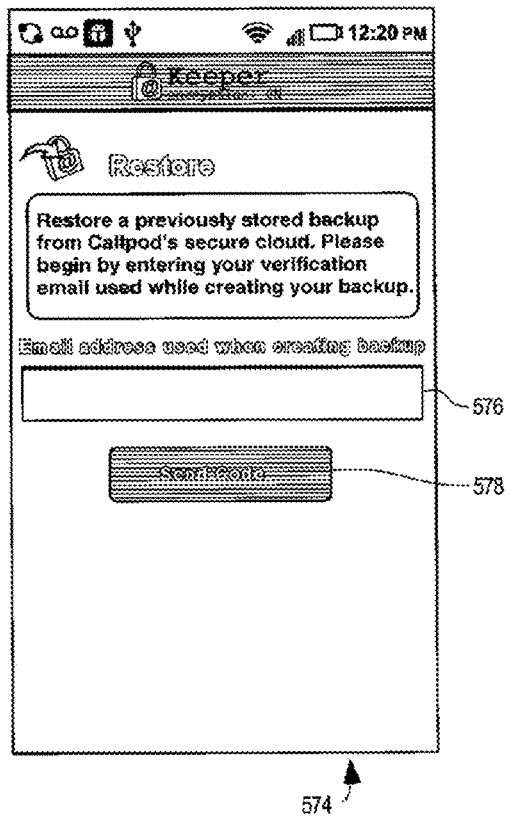
Figure 15E:
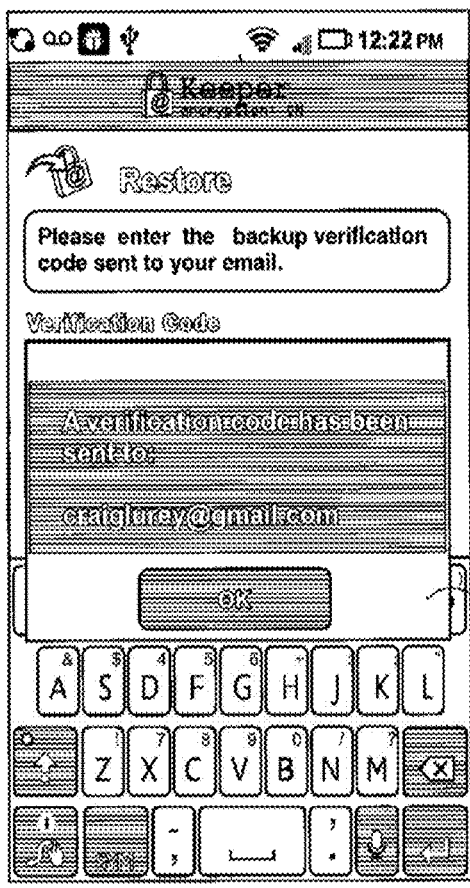
Figure 15F:
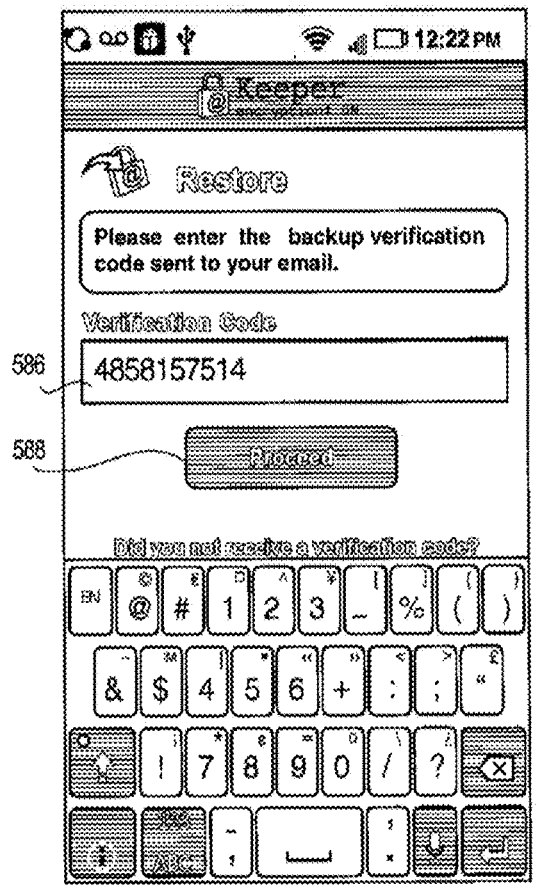
Figure 15G:
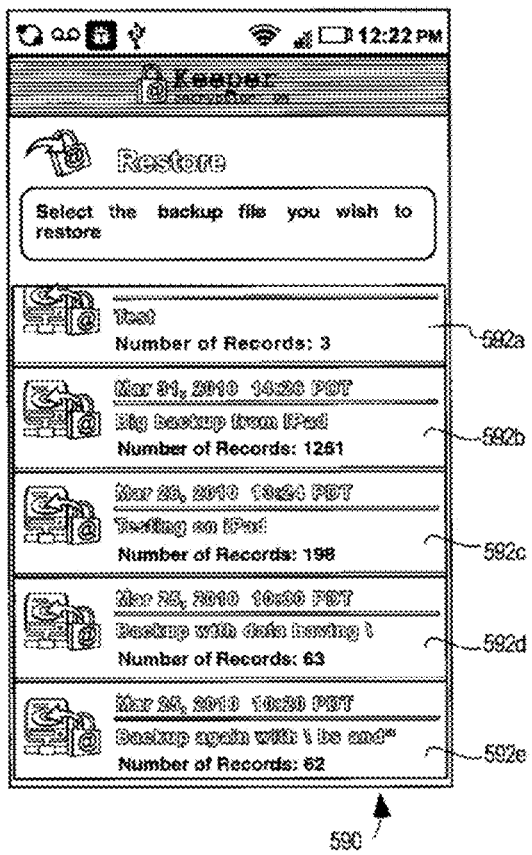
Figure 15H:
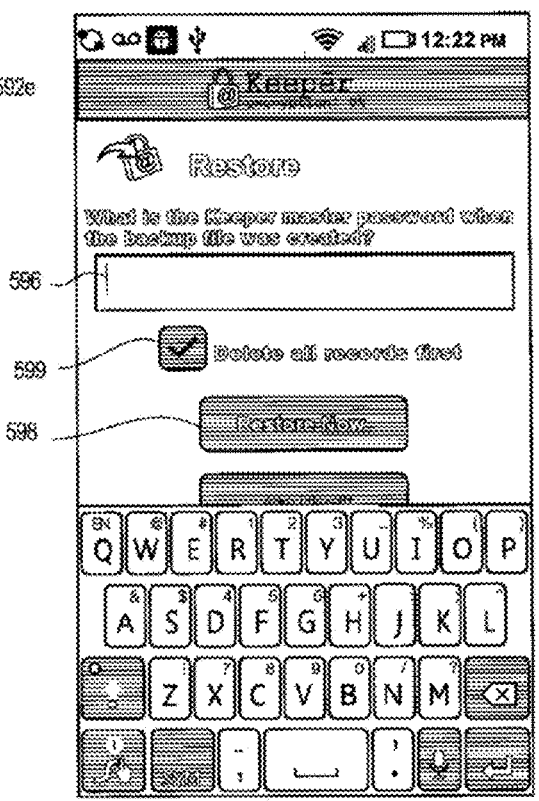

To restore data to one of the electronic devices from the remote server, the user initiates the cloud data restore routine by selecting softkey 558, whereupon a screen 574 (FIG. 15D) is presented to the user. The user enters the same email address in the data entry box 576 that was previously entered in the data entry box 570 when creating the backup file. The user then activates softkey 578. If the email address entered in the data entry box 576 matches the email address entered in the data entry box 570, then the remote server sends a verification code to the email address, which is reported to the user in screen 580 (FIG. 15E). If the email addresses entered in data entry boxes 570 and 576 do not match, no verification code is sent. The user then selects an acknowledgment softkey 582, and a screen 584 (FIG. 15F) is presented to the user. The user retrieves the verification code from his or her email account and then enters the verification code into a data entry box and submits the verification code to the remote server by activating softkey 588. If the verification code entered into data entry box 586 matches the verification code sent by the remote server, then a screen 590 (FIG. 15G) is presented to the user, which shows a list of backup files associated with the user 592a, 592b, 592c, 592d, 592e. The user selects the backup file he or she wishes to restore to the electronic device and a screen 594 (FIG. 15H) is presented, which presents to the user the security question selected at dropdown menu 564 selected when creating the backup file 592a, 592b, etc. selected. The user enters the answer to the question in a data entry box 596 and sends the answer to the remote server by selecting the softkey 598. If the email entered in the data entry box 576, the verification code entered in the data entry box 586, and the answer entered into the data entry box 596 all match the corresponding prior data, then the remote server creates a decryption key, which is used to decrypt the backup file, and transmits the decrypted backup file to the electronic device over a secure communication channel. The backup file is then written to the electronic device, and then re-encrypted on the portable electronic device with the master password. The user may optionally choose to delete all records 24, 26 already on the electronic device before the backup file is written to the electronic device by selecting an on/off box 599.

Figure 16:
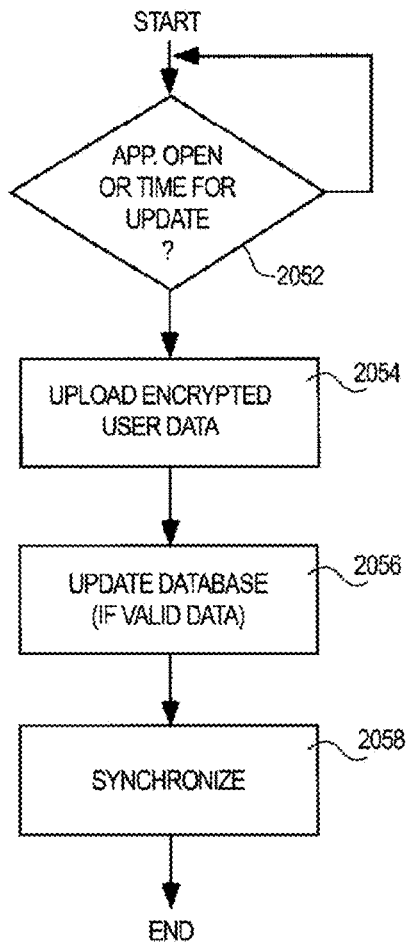
FIG. 16 is a flow chart of programming executed by the system of FIG. 1 to implement the asynchronous auto-sync operation.

Referring next to FIG. 16, the programming to implement the asynchronous auto synchronization begins at a block 2052, which checks to determine whether the application has been newly opened or, optionally, whether a particular time has elapsed from the last synchronization operation. If neither event has occurred, control pauses at the block 2052; otherwise, control passes to a block 2054 that uploads the encrypted user data to the central server. The server checks the uploaded data to determine if such data are valid and, if so, the fields of the database maintained on the central server are updated for the particular records where data has changed since the last synchronization operation. A black 2058 then synchronizes remaining devices associated with the particular user.

Figure 17:
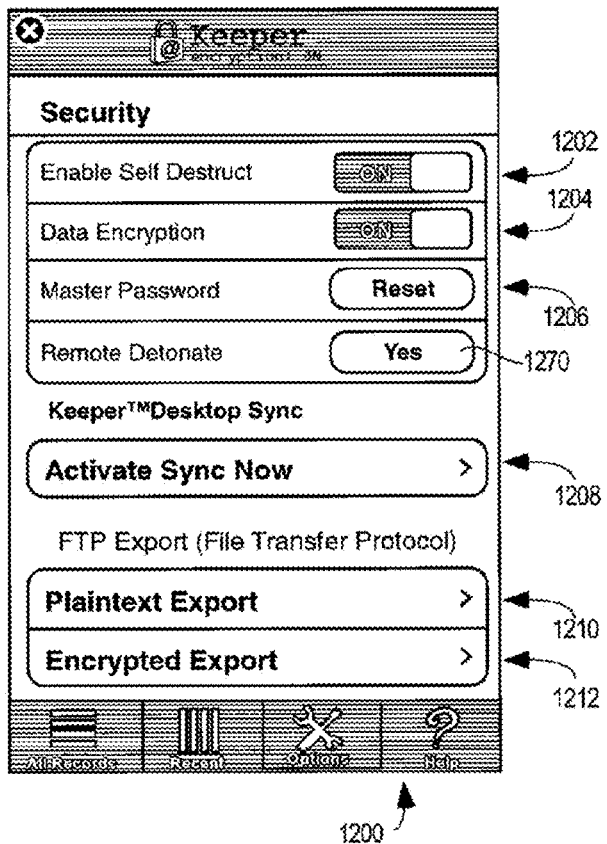
FIG. 17 is a synchronization screen similar to FIG. 13 that permits a user to request deletion of records on a lost or stolen device.

Referring next to FIG. 17, in the case of device theft or a lost device, or if the user operating the device is not authorized to have the information stored in his/her application, the owner of the application (and also the owner of the "subscription code") has the ability to issue a remote detonation of the mobile database or individual records stored in that database. When the application begins execution, a request is sent to the central server together with the active subscription code. If a remote detonation of data is requested by actuating a softkey 2070, the server will respond with the command to "detonate" and optionally provide a list of records to delete. The application will automatically perform this detonation upon request.

Figure 18:
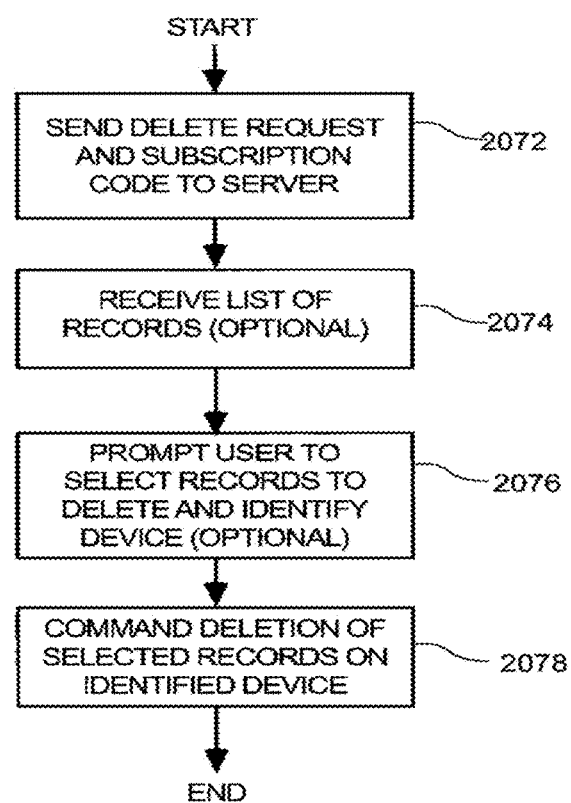
FIG. 18 is a flow chart of programming responsive to actuation of a softkey of FIG. 17 to delete selected records on a lost or stolen device.

More specifically, once the remote detonate softkey 2070 has been actuated, the software of FIG. 18 is executed by the system 10 (here shown as being initiated from the mobile device). The software begins at a block 2072, which sends the detonation request and subscription code and device ID to the central server. (Note—see the question above regarding the device ID) Following the block 2072, a block 2074 may receive an optional list of all records that may be marked for deletion on the lost or stolen device. A further block 2076 may optionally prompt the user to select records to delete and may further prompt the user to identify the device that has been lost or stolen, if such device has not been previously identified at the block 2072. A block 2078 then commands the deletion of selected records on the identified device via the central server.

Figure 19:
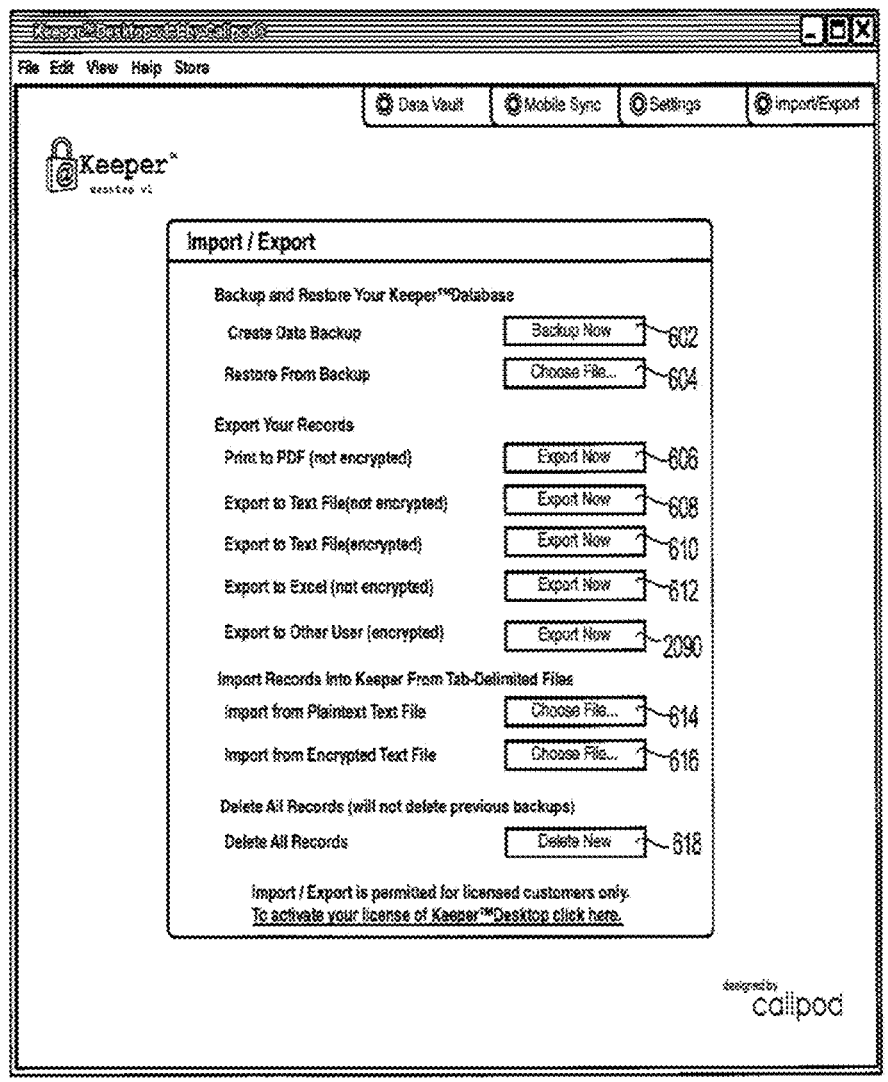
FIG. 19 is an Import/Export screen similar to FIG. 7 that permits a user to request transmission of selected records to another user.

Referring next to FIG. 19, in order to share password records between users, for example, between husband and wife or employees at a company, a mechanism for transmitting this password data in a secure and timely fashion is required. Additionally, in order for this feature to be used without burden, the feature needs to be simple and easy to use with minimal clicks. This may be accomplished, for example, by actuating a softkey 2090 in the Import/Export screen of the application that permits a first user to request the transmission of a record. The central server provides the user with a unique alphanumeric sequence of sufficient character length and a number of seconds for which the sequence will be valid (e.g., 60 seconds). Referring also to FIG. 20, programming executed by the application running on the first user's device begins at a block 2092, which awaits receipt of a unique alphanumeric sequence from the central server. Once this sequence is received, a block 2094 prompts the first user to identify a second user and record(s) to be sent to the second user. A block 2096 then encrypts the information to be sent with a cipher generated from the unique sequence and transmits the encrypted data to the central server.

The first user provides the unique alphanumeric sequence to the second user via telephone or text message. Referring to FIG. 21, which illustrates programming executed by the application running on the second user's device, a block 2100 checks to determine whether a transfer request has been received from the central server. Once this occurs, a block 2102 prompts the second user to type in the unique alphanumeric sequence or accept the text message (SMS) into the second user's application, which enters the sequence on behalf of the second user. The sequence is then transmitted to the central server by a block 2104. Thus, the application on the second user's device requests access from the central server to any information associated with the given sequence. If the information is found, and if the second user has requested the information within the time period allocated, the information is delivered to the second user in encrypted format. A block 2106 decrypts the record with the key as the cipher.

This method protects from brute force attack in addition to the cipher strength of the encryption/decryption algorithm chosen.

To further facilitate and extend the above-described password and account numbers protecting application, a computer-implemented input method is provided to enable the user of a mobile computing device to quickly login to his/her favorite websites and native applications (hereafter referred to as native apps) residing on the mobile device. Broadly speaking, exemplary embodiments of the provided input method enables a fast filling of login fields so credential information need not be entered again by the user on space-limited data entry interfaces when he/she wishes to login to previously accessed websites or native apps, but still enabling high security and authentication.

In the following description, numerous particular details are set forth in order to provide a thorough understanding of the provided computer-implemented input method. It will be apparent, however, to one skilled in the art that this method may be practiced without some or all of these particular details. Hereafter well-known process operations have not been described in detail in order not to unnecessarily obscure this method. Exemplary embodiments of the method will now be described in detail with reference to the accompanying drawings.

As known to one of ordinary skills in the art, a mobile device can access a network through a communication service provider system to interface with networked entities, and service providers. The network can either be a local network or a wide area network, such as the Internet (e.g., Web). The Internet, as is well known, is defined by an ever growing number of entities, computing resources, storage, databases and networks that provide content, enable execution of data, access of data, and transfer of data. The type of data and functionality will depend on the particular needs of an infrastructure or individuals accessing the data. A typical mobile device allows a user to access the Internet, and visit websites that are hosted by particular service providers, companies, or individuals. Thus, the user may access the Internet through the mobile device, and communicate with or access a digital service provider.

The digital service provider may operate a website that provides a multitude of services in addition to providing access to other websites, searches, and information. One example of a digital service provider may be an Internet company such as Google, Inc., and Yahoo, Inc., both of which can provide searching capabilities, services, and links to various information. The digital service provider may therefore provide services related to electronic mail services, music and/or images, video data, etc., among other services. In addition to providing a multitude of services and providing access to information, the digital service provider may also be working with other partner service providers to extend or augment service possibilities and offerings.

By providing a secure combination of input data that the user has to provide, the digital service providers are able to prevent unauthorized use of the various services. Additionally, the digital services that are being provided by the digital service providers and partner service providers, for example, have been growing in terms of the type of devices that can access the various services. In recent years, portable devices such as mobile phones, personal digital assistants (PDAs), and other small computing devices have been provided with more access to digital services, and these digital services require that users authenticate themselves before accessing various digital service products.

As mentioned above, these digital services are being provided for mobile phones, which are typically provided with less than a full size qwerty physical keyboard or virtual keyboard. Without loss of generality, the provided input method will be described in relation to virtual keyboards. Without access to a full size qwerty virtual keyboard, users are left with having to access or input data for verifying credentials through a size limited data entry interface. Some mobile phones, for example, include all the basic numbers for dialing standard numbers, however in order to access other keys to enter letters or symbols, the user may be required to tap on a particular number several times and/or hit shift keys until the desired digit, symbol or letter appears on the screen.

Because users are required to enter more and more complicated credentials to avoid theft or unauthorized use of services, they are required to enter these complicated strings of letters, numbers, and symbols through space-wise limited virtual keyboards. Accordingly, one embodiment of the present disclosure provides a method for enabling a user to quickly login to websites and native apps while using a mobile device having limited data entry interfaces. As will be described below, the process includes installing the quick login application or method (hereafter referred to as the fast fill application) to be used to quickly login through a web portal (e.g., a website of a service provider) or an app, and then followed by an installation of the above-described password and account numbers protecting application, if not already installed.

When a mobile device user is searching or surfing on the Internet, he/she can see an advertisement ("ad") promoting an extension of an application, which prompts him/her to click on it or an associated link to download it. As known to own of ordinary skills in the art, an application extension is typically configured to extend a functionality of a corresponding app by providing a new feature. Moreover by clicking on the link, the user may be provided either a lead to the app's extension description, or simply begin downloading. Clicking on the app's extension may also lead the user to the website of the app.

Accordingly, in one embodiment, the user is prompted to install the exemplary fast fill application, which is configured as an app extension of the above-described password and account protecting application, while surfing the Internet, while logged in or during a login into or while installing the password and account numbers protecting application. Once installed, in accordance with another embodiment, this fast fill application is configured to automatically restart when the mobile device is restarting. Upon a first restart, the user is required to login to this fast fill application. Moreover, this fast fill application is configured to be running as a foreground service and monitoring the browser history of the user. As such, the next time the user is surfing on a website or logging into any native app, the fast fill application is configured to generate and display a lock button on a particular side of the screen. In one embodiment, the particular side of the screen can be the right side of the screen. Moreover, if the user is already logged in to the password protecting application, the lock button may be displayed with a particular color, such as gold color for example. Alternatively, if the user is not logged in to the password protecting application, the lock button may be displayed with an alternate color that is different from the particular color, such as gray color for example.

Accordingly unlike any known application configured for form filling of login credentials on websites, the proposed fast fill method is configured to replace the user's input method of the mobile device by literally removing the virtual keyboard and replacing it with an input interface screen that includes a fast fill dialog box comprising login information buttons, which when tapped by the user enable the filling/populating of the login information on a particular website or a native app. Alternatively, in lieu of replacing the virtual keyboard, the proposed method may be configured to overlay it with the fast fill dialog box. As discussed above and known to one of ordinary skill in the art, the mobile device 32 can include more than one processor and at least one memory for storing instructions to be performed by the processors.

Figure 22:
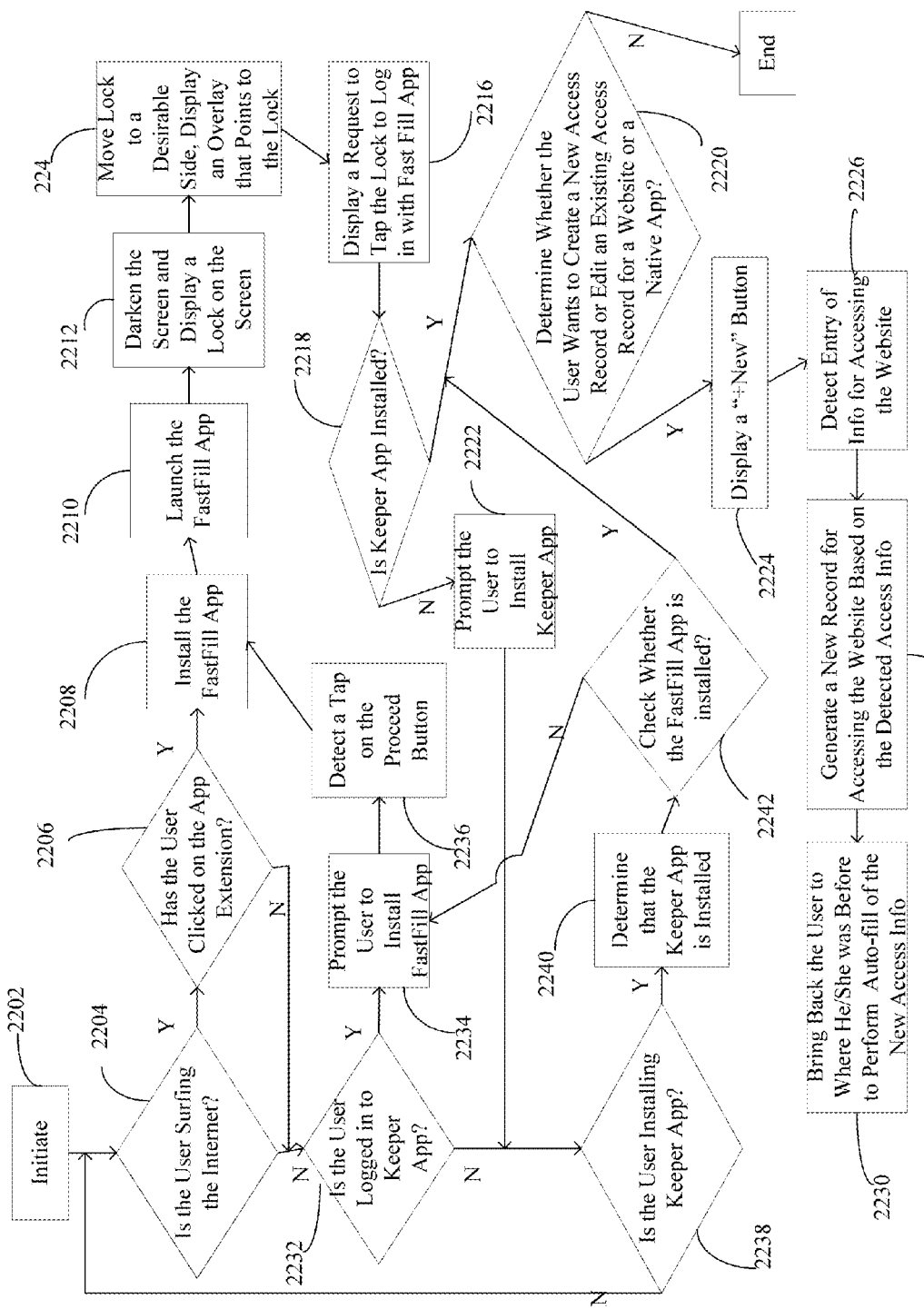
FIG. 22 is a flow chart illustrating an exemplary embodiment of a method for installing a quick login (i.e., Fast Fill) application on a mobile device.

As stated above, while surfing the Internet, the user may view a display of an ad for downloading the fast fill application, which is an extension of the password protecting application. Alternatively, the user may be prompted to install the fast fill application while logged in, during a login into, or while installing the password and account numbers protecting application. Now referring to FIG. 22, a flow chart illustrates an exemplary embodiment of a method, initiated at Step 2202, for installing the fast fill application 2602, shown in FIG. 25, which will be described in greater detail hereafter, on the mobile device 32 of FIG. 1. As stated above, while surfing the Internet, at Step 2204, the user may encounter an Internet promotion to download the fast fill application 2602. As such, during such Internet surfing the user may opt to proceed with the application download, at Step 2206. Upon detection of a click to proceed with the download, a processor, such as processor 18, is configured to proceed with the installation of instructions of the fast fill application 2602 in a memory unit 2506, shown in FIG. 25, at Step 2208. Based on the instructions, processor 18 can be configured to automatically launch fast fill application 2602 or display a dialog box asking the user whether he/she wishes to launch the fast fill application 2602.

Figure 23A:
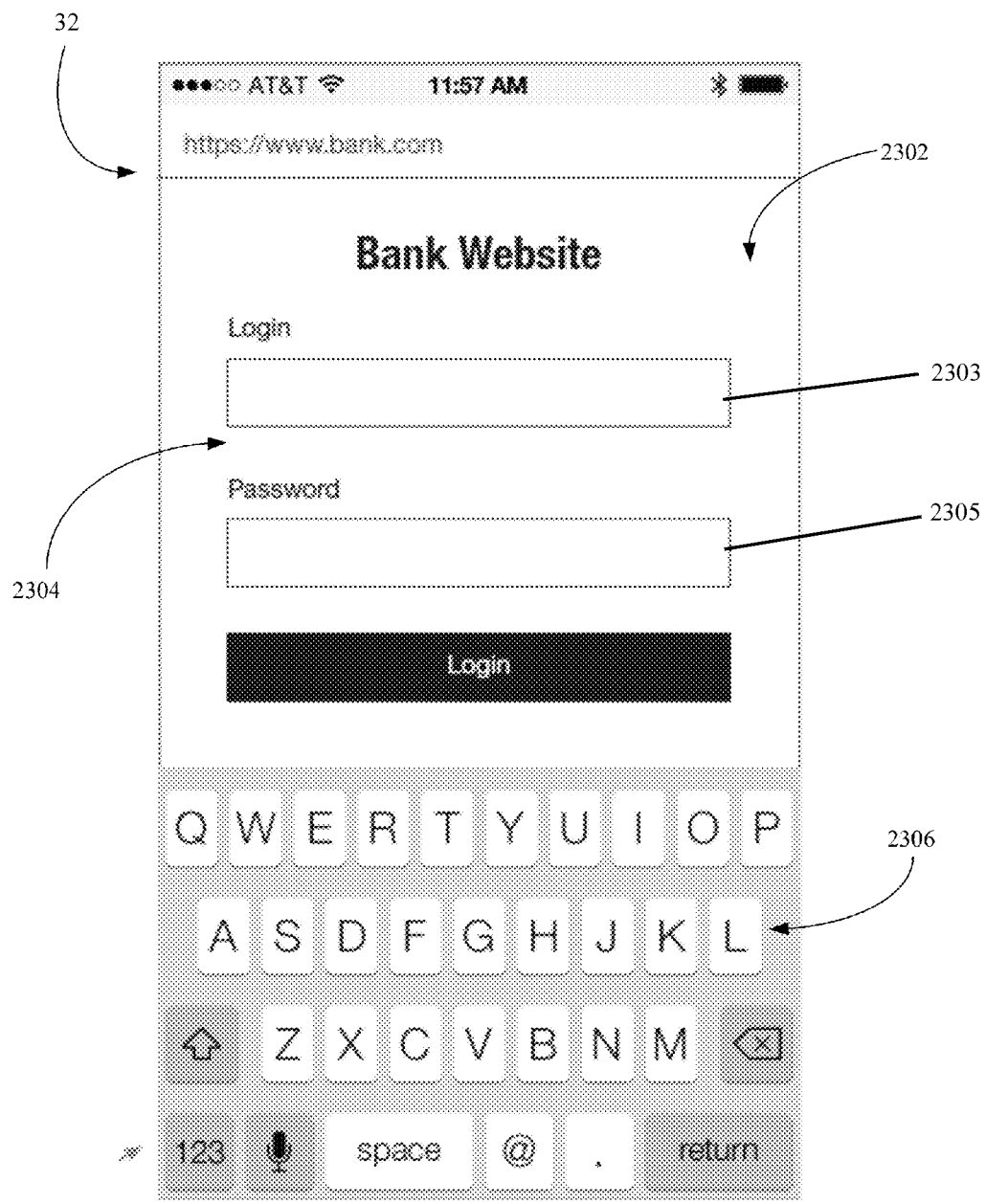

Following the launching of the fast fill application 2602, at Step 2210, processor 18 proceeds with darkening the screen 2302, shown in FIG. 23A, of mobile device 32 and with displaying a lock (i.e., a locking key) 2308 thereon, at Step 2212. In one embodiment, lock 2308 may be displayed in a large form, such as about ten percent (10%) of screen 2302. Subsequently, at Step 2214, processor 18 may move lock 2308 to a particular area of screen 2302, such as the right side of screen 2302, shrink the lock 2308 to a predetermined smaller size, and display an overlay (not shown) that points to lock 2308. In one embodiment, the displayed overlay states to the user to tap the lock 2308 when he/she wishes to login with the fast fill application 2602, at Step 2216. The processor 18 may be configured to generate and display an "OK" button, which when tapped on triggers a closing of the overlay and a hiding of the lock 2308.

Alternatively, if the fast fill application 2602 is not yet installed, the user would be prompted to tap a displayed "Proceed" button, and then select the fast fill application 2602 by tapping on an associated button to trigger the installation.

Following the hiding of the lock 2308 or the installation of the fast fill application 2602, the processor 18 is configured to determine whether the password and account numbers protecting application 2604 is already installed, at Step 2218. In the affirmative, the processor 18 is configured to generate and display a dialog box asking the user whether he/she wishes to create a new record for a particular website or native app, at Step 2220. Otherwise, the processor 18 generates another dialog box to prompt the user to proceed with the installation of the password and account numbers protecting application 2604, at Step 2222. Moreover, the dialog box may further include timing choices for this installation, such as "Install Now" or "Install Later" choices.

Upon detecting a tapping by the user on a displayed proceed button to create a new record for a particular website or a native app, the processor 18 is configured to generate and display a "+New" button, at Step 2224. Following a detection of a tapping or a clicking on the "+New" button, at Step 2226, if the user has already registered his/her credential data (i.e., authenticating credentials) with the particular website, the user is prompted to enter the registered confidential data, which may include the user name, the user email address, a password, and may be a pin number, which will be stored as a record of website accessing data in memory unit 2506 and will be used by the fast fill application to quickly login the user whenever he/she would like to access again the particular website, at Step 2228. A similar process can be used for storing registered data required for login to a native app. Following the storing of the new website record, the processor 18 is configured to bring back screen-wise where the user was before to perform a quick login to the particular website or the native app, at Step 2230.

Following a determination that the user is not surfing the internet, at Step 2204, the processor 18 may be configured to determine whether the user is logged in to the password and account numbers protecting application 2604, at Step 2232. In the affirmative, the processor 18 is configure to prompt the user to install the fast fill application 2602 by displaying a proceed button, at Step 2234. Upon detection of a tap on the proceed button, at Step 2236, the processor 18 is configured to proceed to Step 2208 where the installation is performed. In case, the user is found not to be logged in to the password and account numbers protecting application 2604, the processor is configured to determine whether the user has already started installing the password and account numbers protecting application 2604, at Step 2238. In the affirmative, following a determination by the processor 18 that the protecting application 2604 is installed, at Step 2240, the processor 18 is configured to check whether the fast fill application 2602 is already installed, at Step 2242. Otherwise, the processor 18 returns to determining whether the user is surfing the Internet, at Step 2204. Moreover, if the fast fill application 2602 is found to be already installed, the processor 18 proceed with the display of the dialog box mentioned above in relation to Step 2220, where the user is asked whether he/she wishes to create a new record for a particular website or native app.

Figure 24:
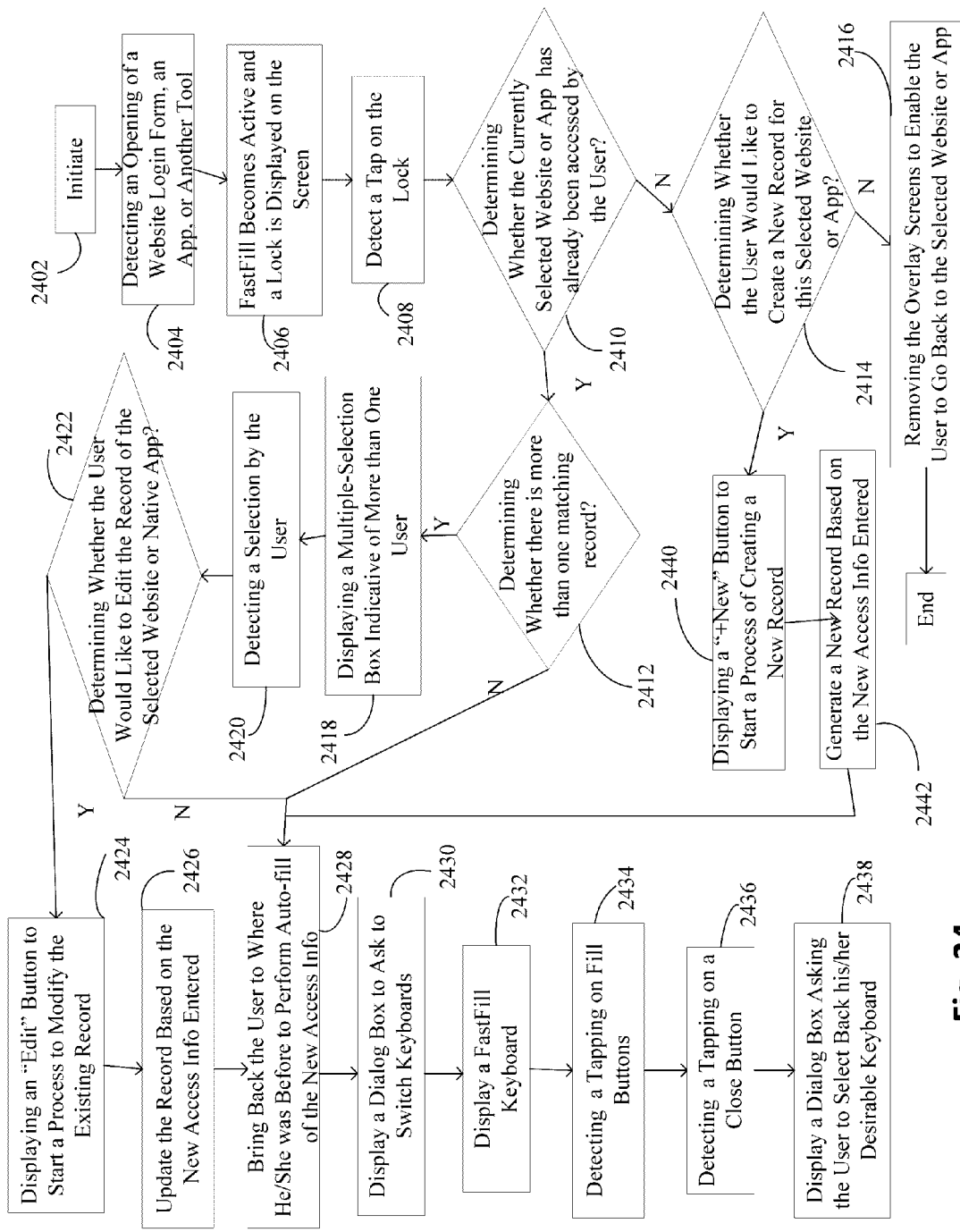
FIG. 24 is a flow chart illustrating an exemplary embodiment of a method for enabling the user using a mobile device to quickly login to a website or a native app.

As stated above, once installed the fast fill application 2602 is configured to be running as a foreground service and monitoring the browser history of the mobile device 32. Now referring to FIG. 24, a flow chart illustrates an exemplary embodiment of a method, initiated at Step 2402, for enabling the user using the mobile device 32 to quickly login to a website, such as that of a bank having "https://www.bank.com" as the Web address (also referred to as the uniform resource locator (URL)), or a native app. At Step 2404, the processor 18 detects a receipt of a login form from the website, or an opening of a login form of a native app, or another login tool. As shown on screen 2302 of mobile device 32, the website login form 2304 may be that of the bank website and may include a login box 2303 for entering a user login name or an email address and a password box 2305. Moreover, as shown, the processor 18 displays a user's preferred virtual keyboard 2306 on screen 2302.

Figure 23B:

In response to the detection of the opening of the login form 2304, the fast fill application 2602 becomes active and the processor 18 generates and displays the lock 2308 on the right side of the screen 2302 as shown in FIG. 23B, at Step 2406. As stated above, if the user is already logged in to the password protecting application 2604, the lock 2308 is displayed with a gold color. Otherwise, the lock 2308 will be displayed in a gray color. Upon detection of a tap on the lock 2308, at Step 2408, the processor 18 is configured to determine, at Step 2410, whether the selected website or native app has previously been accessed by the user. In the affirmative, the processor 18 determines whether there is more than one matching record of the selected website or native app by checking the record database 2508, at Step 2412. Otherwise, the processor 18 generates a dialog box to ask the user whether he/she would like to create a new record for the selected website or native app, at Step 2414. In the negative, the processor 18 removes the lock 2308 and any displayed overlay that points to the lock 2308, at Step 2416.

Figure 23C:
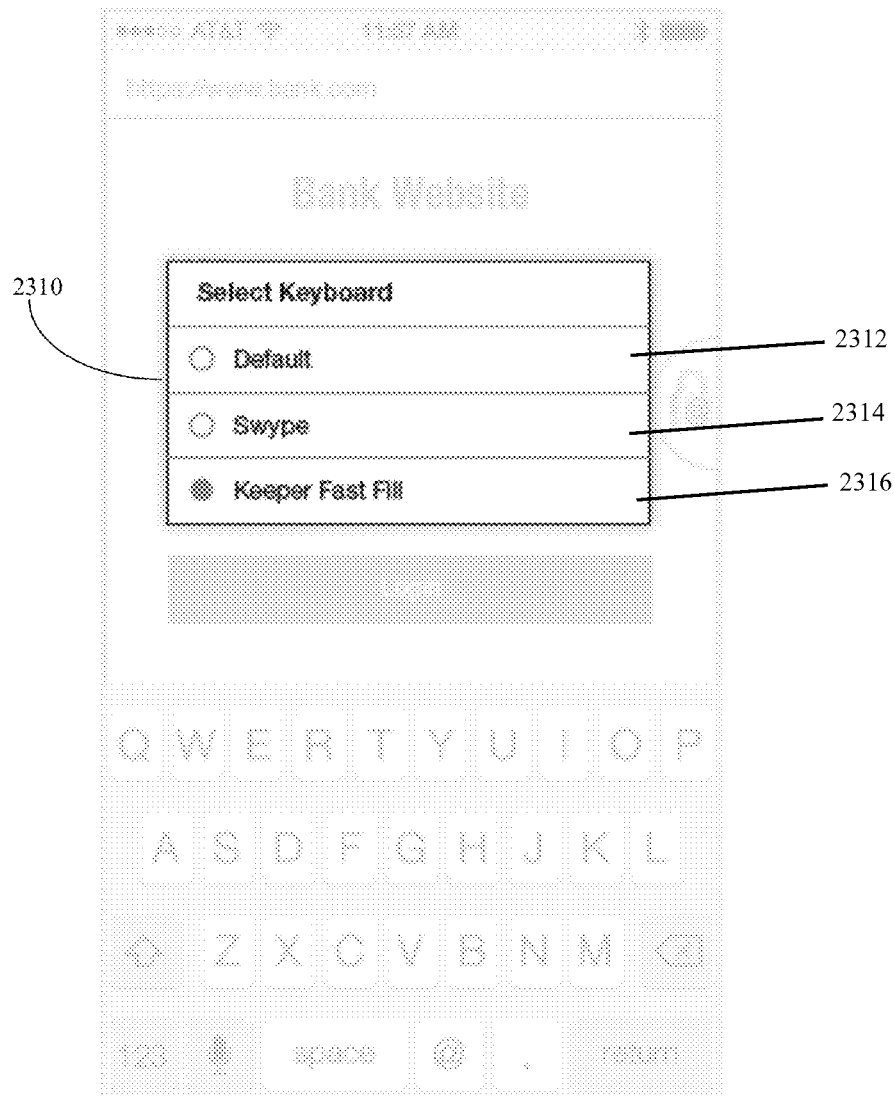
Figure 23D:
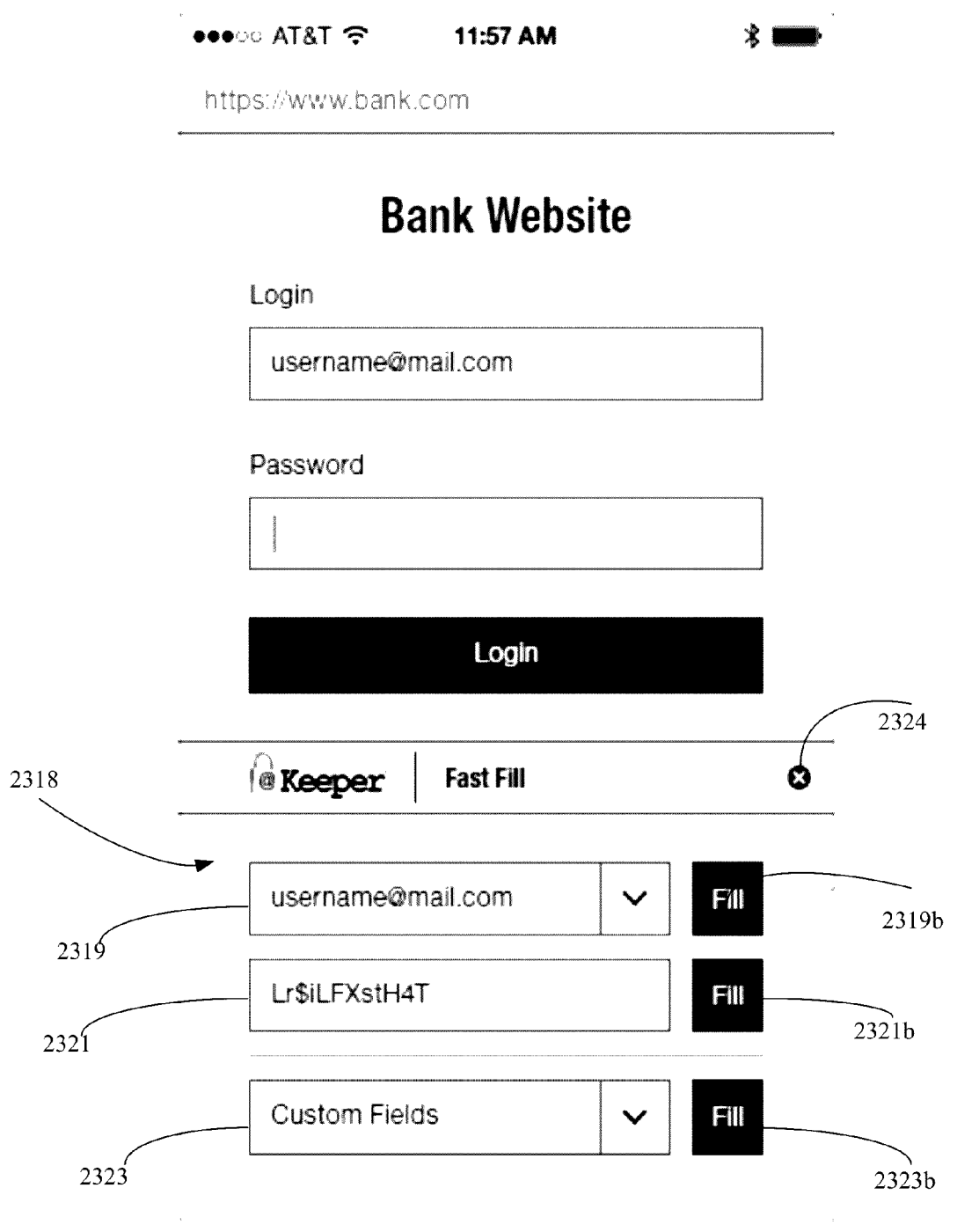
Figure 23E:
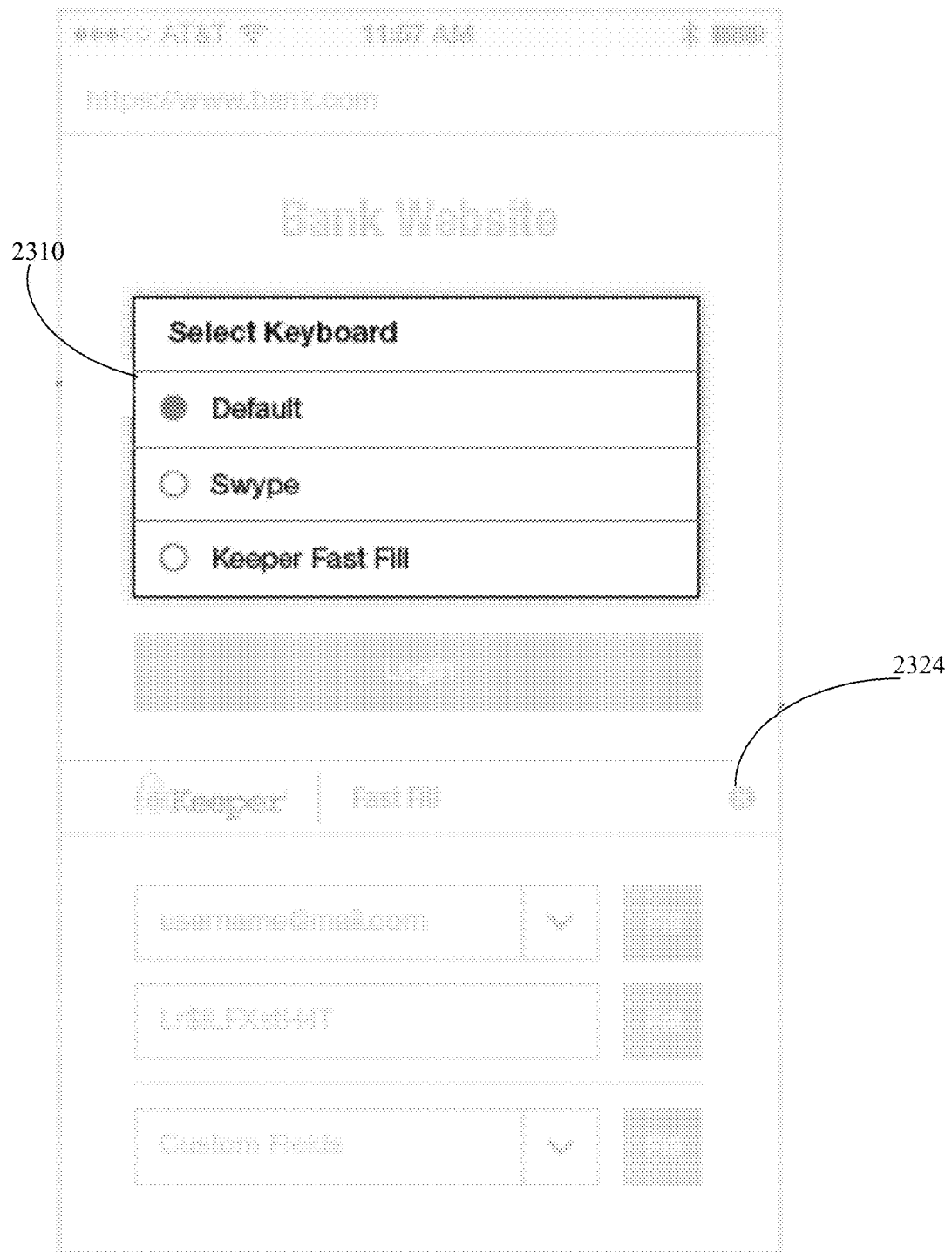

Upon determination that there is more than one matching record for the selected website or native app, the processor 18 is configured to generate and display a multiple selection box indicative of more than one user, at Step 2418. Upon detection of a particular selection from the multiple selection box, the processor 18 is configured to generate and display a dialog box asking the user whether he/she would like to edit the existing record of the particular website or native app, at Step 2422. In the affirmative, the processor 18 generates and displays an "Edit" button to be tapped by the user to start a process of modifying (updating) the existing record (information), at Step 2426. Once the information has been updated and saved, the user is brought back where he/she was before so that the user can perform the auto-fill of the updated information, at Step 2428. Then at Step 2430, the processor 18 generates and displays a keyboard selection box 2310, shown in FIG. 23C, asking the user to select a default keyboard box 2312, a preferred keyboard box 2314, such as a "Swype" keyboard for example, or a fast fill keyboard box 2316.

Upon detection of a selection of the fast fill keyboard box 2316, the processor 18 is configured to remove the keyboard selection box 2310, and replaces the user's preferred keyboard with the fast fill keyboard 2318, which is displayed below the bank website login form 2304 on screen 2302, at Step 2432. As show in FIG. 23D, the displayed fast fill keyboard 2318 can include a number of boxes, such as an email address box 2319, a password box 2321, and a custom field box 2323, each of which has an associated auto-fill button 2319*b*, 2321*b*, and 2323*b*, respectively. At Step 2434, the user can tap on the auto-fill button of his/her choice to fill the login, password, or other custom field to login to the particular website or native app. At Step 2436, upon detection of a tapping on a "Close" button 2324, shown in FIG. 23D, the processor 18 is configured to generate and display the keyboard selection box 2310 to enable the user to select his/her preferred keyboard, at Step 2438.

In case, the user opts to create a new record, the processor 18 is configured to generate and display a "+New" button to be tapped by the user to start a process of creating the new record for the particular website or native app, at Step 2440. As discussed above, following a tapping on the "+New" button the user is prompted to enter the confidential data required by the particular website, and which is then stored as a new record in a record database unit 2508, at Step 2442.

Following a determination that there is no more than one matching record, at Step 2412, the processor 18 is configured to bring back the user where he/she was before so that the user can perform the auto-fill of the updated information, at Step 2428.

In one embodiment, following a detection of a tapping on the lock 2308, the processor 18 is configured to determine whether the user has never signed on the mobile device 12. In the affirmative, the user is prompted to register for an account on the password and account numbers protecting application 2604. Following a tapping on a proceed button, the password and account numbers protecting application 2604 opens and the user can proceed through the registration process, discussed above.

In another embodiment, if the user has already registered for an account on the password and account numbers protecting application 2604, but he/she is not logged in, he/she would be prompted to login with a dialog box that is displayed floating on the screen 2302 while continuing to use the currently selected keyboard. Once, the user has logged in successfully, he/she will be immediately prompted to choose his/her input method with the keyboard selection box 2310 (i.e., a system pop-up input method selector). As mentioned above, the keyboard selection box 2310 includes the fast fill keyboard box 2316, and following a selection of the fast fill keyboard box 2316, whatever keyboard the user had on display disappears and the fast fill keyboard 2318 appears on the screen 2302 in place of the user's keyboard.

Regarding screens provided to the user by the password and account numbers protecting application 2604, a new screen section corresponding to the fast fill application 2602 can be added. In one embodiment, if the fast fill application 2602 is not yet installed, an "Install Now" button, and a statement informing the user that this application gives him/her the power to quickly access a website or a native app would be displayed underneath the new screen section. Moreover, the user may be provided options to keep the fast fill application logged in for a desired amount of time (i.e., "Keep FastFill logged in for [xxxx] minutes/hours/days"), and to start automatically (i.e., "[x] Start FastFill automatically").

Since, as stated above, the fast fill application 2602 is configured to determine whether a web browser or a native app is running, an additional process may be configured to store and/or scan for a package name and correlate it to a stored record. Subsequently, the additional process can perform a lookup online in a database associated with the password and account numbers protecting application 2604 to determine the app name for the package name. Moreover, after launching the password and account numbers protecting application 2604 by passing in the package name, an associated process would open either an edit screen or a detail screen, based on whether or not a matching record is stored in the database.

Figure 25:
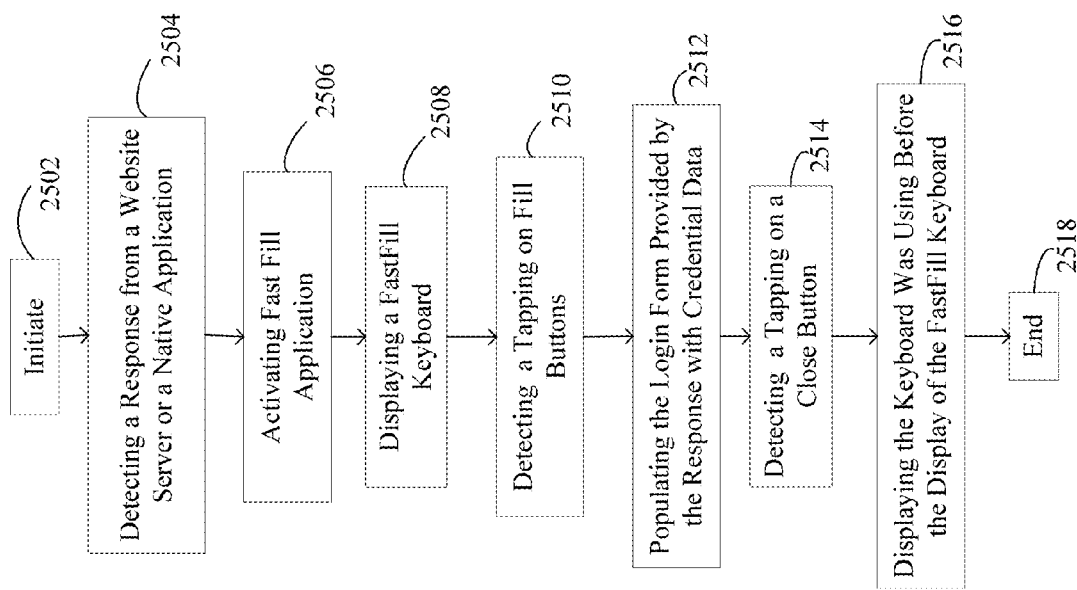
FIG. 25 is a flow chart illustrating an exemplary embodiment of an another method for enabling the user using a mobile device to quickly login to a website or a native app.

Now referring to FIG. 25, a flow chart illustrates an exemplary embodiment of an alternate method 2500, initiated at Step 2502, for enabling the user using the mobile device 32 to quickly login to a website, or a native app, by automatically displaying the fast fill keyboard 2318 without being selected by the user on the displayed keyboard selection box 2310. At Step 2504, the processor 18 detects a response from a website server or a native application residing in mobile device 32. In regard to the website server, the detected response may include an opened login form or an URL, associated with the website, which corresponds to the login form. In reaction to the detection of the response, fast fill application 2602 becomes active, at Step 2506, and the processor 18 generates and displays the quick login keyboard 2318, at Step 2508. As stated above, the quick login keyboard 2318 can include a number of boxes, such as an email address box 2319, a password box 2321, and a custom field box 2323, each of which has an associated auto-fill button 2319*b*, 2321*b*, and 2323*b*, respectively. At Step 2510, processor 18 detects a tap by the user on the auto-fill button of his/her choice to fill the login fields, which may include a user's email address field, a password field, or other custom fields to login to the particular website or native app. At Step 2512, upon detection of a tapping on one or more of the auto-fill buttons 2319*b*, 2321*b*, and/or 2323*b*, the processor 18 is configured to proceed with auto populating the login form using the user's authenticating credentials that correspond to the tapped auto-fill buttons based on instructions provided by fast fill application 2602. Subsequently, upon detection of a tapping on the "Close" button 2324, at Step 2514, the processor 18 is configured to the keyboard that the user was using prior to displaying the quick login keyboard 2318; thereby enabling the user to proceed with his/her intended activities on the website or with the native app.

Figure 26:
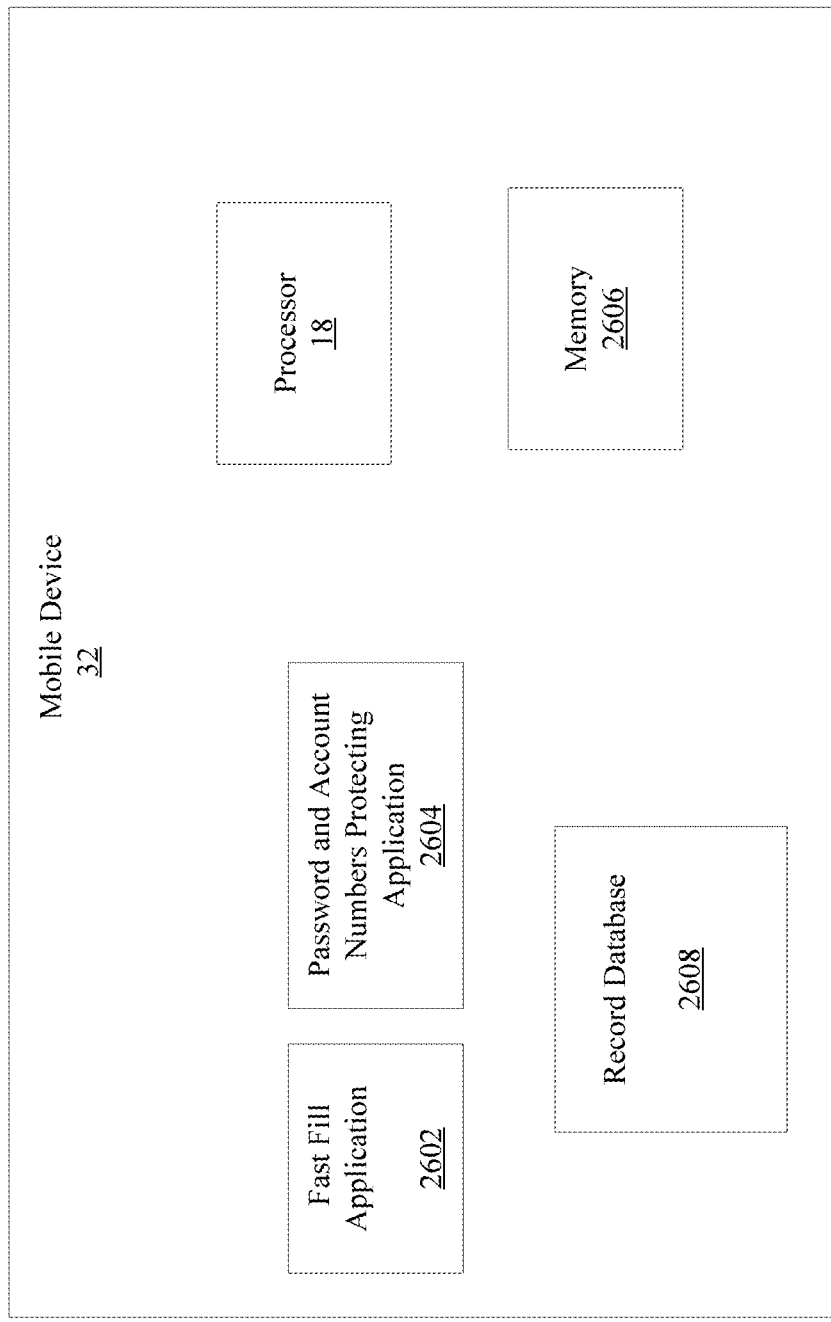
FIG. 26 is a schematic diagram illustrating components of the mobile device of FIG. 1.

As shown in FIG. 26, mobile device 32 includes the fast fill application or program 2602, the password and account numbers protecting application or program 2604, the processor 18, and the memory 2606. Processor 18 can be implemented on a single-chip, multiple chips or multiple electrical components. For example, various architectures can be used including dedicated or embedded processor or microprocessor (μP), single purpose processor, controller or a microcontroller (μC), digital signal processor (DSP), or any combination thereof. In most cases, processor 18 together with an operating system operates to execute computer code and produce and use data. Memory 2606 may be of any type of memory now known or later developed including but not limited to volatile memory (such as RAM), non-volatile memory (such as ROM, flash memory, etc.) or any combination thereof, which may store software that can be accessed and executed by processor 18.

Figure 27:
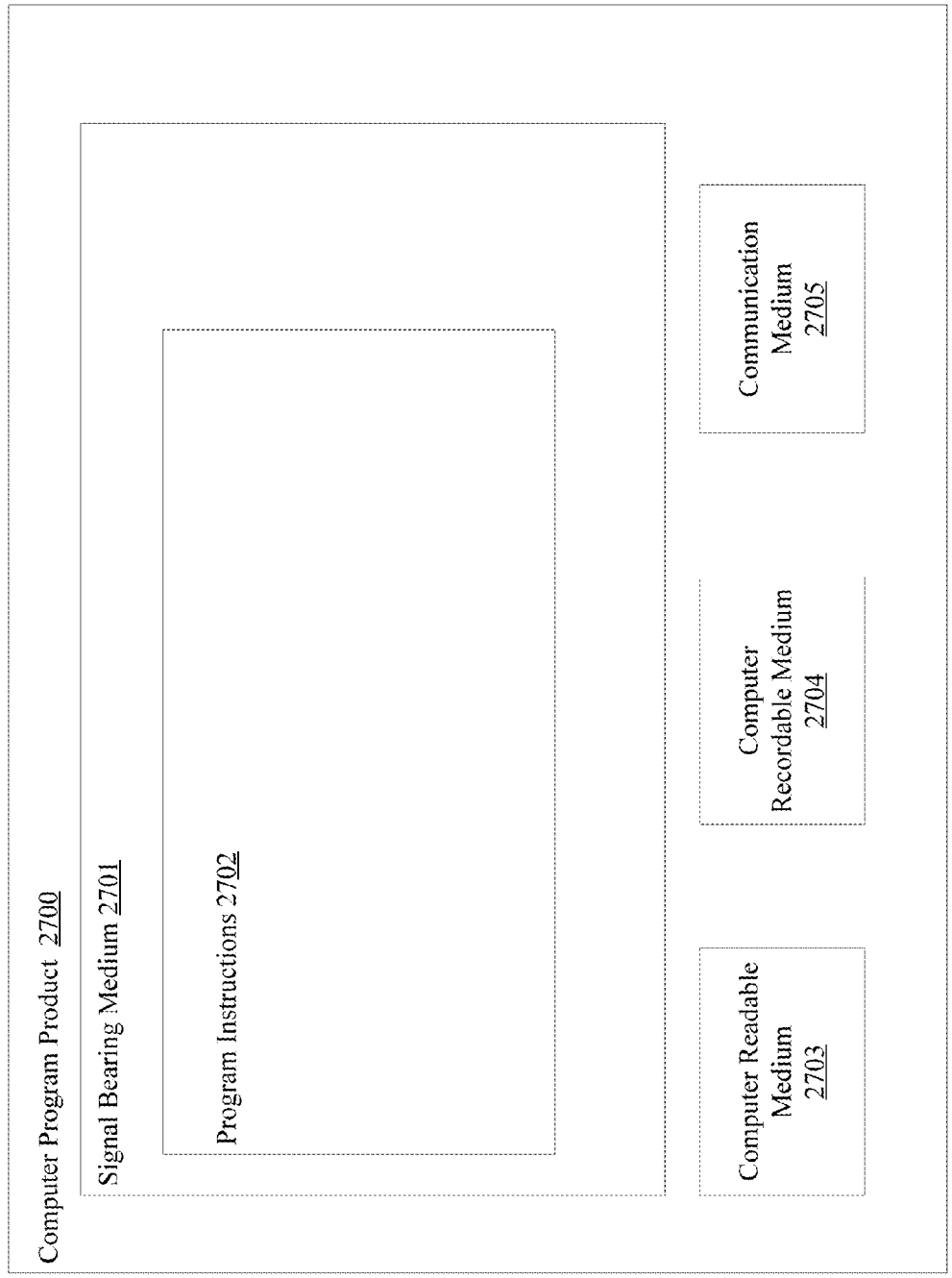
FIG. 27 is a schematic diagram illustrating a conceptual partial view of an example computer program product.

In some embodiments, the disclosed methods may be implemented as computer program instructions encoded on a computer-readable storage media in a machine-readable format. FIG. 27 is a schematic illustrating a conceptual partial view of an example computer program product 2700 that includes a computer program for executing a computer process on a computing device, arranged according to at least some embodiments presented herein. In one embodiment, the example computer program product 2700 is provided using a signal bearing medium 2701. The signal bearing medium 2701 may include one or more programming instructions 2702 that, when executed by a processing unit may provide functionality or portions of the functionality described above with respect to FIGS. 14, 16, 18, 20-22, 24, and 25. Thus, for example, referring to the embodiment shown in FIGS. 22, 24, and 25, one or more features of blocks 2202-2242, 2402-2442, and 2502-2518 may be undertaken by one or more instructions associated with the signal bearing medium 2701.

In some examples, signal bearing medium 2701 may encompass a non-transitory computer-readable medium 2703, such as, but not limited to, a memory. In some implementations, signal bearing medium 2701 may encompass a computer recordable medium 2704, such as, but not limited to, memory. In some implementations, signal bearing medium 2701 may encompass a communications medium 2705, such as, but not limited to, a digital and/or an analog communication medium.

Though the disclosures have been described in terms of specific embodiments and applications, persons skilled in the art may, in light of this teaching, generate additional embodiments without exceeding the scope or departing from the spirit of the claimed subject matters. Accordingly, it is to

The invention claimed is:

1. A computer-implemented method for facilitating a quick login using a mobile computing device having a space-wise limited virtual keyboard, the method comprising:
    detecting a response from a native application native to the mobile computing device, wherein the response includes a login form displayed on a screen of the mobile computing device for authenticating credentials of a user;
    activating an application on the mobile computing device configured to fill the login form;
    displaying a quick login keyboard comprising:
    a plurality of credential data boxes configured to hold credential data of the user for authentication of the user by the native application; and
    a plurality of separate fill buttons, each associated with a respective one of the plurality of credential data boxes;
    detecting a tapping on one of the plurality of separate fill buttons;
    filling the respective one of the plurality of credential data boxes with data associated with the tapped fill button;
    detecting an additional tapping on an additional fill button; and
    filling another one of the plurality of the credential data boxes with data associated with the tapped additional fill button.

2. The computer-implemented method of claim 1, further comprising:
    transmitting the filled login form to a server.

3. The computer-implemented method of claim 1, further comprising:
    communicating to the native application the filled login form when the detected response is from the native application.

4. The computer-implemented method of claim 1, further comprising:
    displaying a login softkey on the screen of the mobile computing device to be tapped by the user for proceeding with the quick login;
    based on a determination that the softkey was tapped, generating and displaying a dialog box including a plurality of keyboard selections, wherein one of the plurality of keyboard selections corresponds to the quick login keyboard associated with the activated fast filling application; and
    detecting a selection of the one of the plurality of keyboard selections that corresponds to the quick login keyboard.

5. The computer-implemented method of claim 4 wherein the softkey comprises a particular logo.

6. The computer-implemented method of claim 1, further comprising:
    detecting a tapping on a close button displayed on the quick login keyboard; and
    replacing the quick login keyboard with a keyboard that was displayed prior to the quick login keyboard.

7. The computer-implemented method of claim 1, further comprising:
    determining whether a database associated with the fast filling application includes one or more matching records of the native application; and
    based on a determination that the database includes one matching stored record, displaying on the screen an editing button for triggering an editing process of the one matching stored record.

8. The computer-implemented method of claim 7, further comprising:
    in case the database is found to have a plurality matching stored records, displaying a multiple selection box; and
    detecting a selection of one of the plurality of matching stored records; and
    displaying on the screen the editing button to be tapped by the user to edit the one of the plurality of matching stored records.

9. The computer-implemented method of claim 8, further comprising:
    determining that the editing process was performed; and
    storing the edited matching record in the database.

10. A non-transitory computer-readable medium comprising programming instructions of a method that are executable by a processor to facilitate a quick login using a mobile computing device having a space-wise limited virtual keyboard, the method comprising:
    detecting a response from a native application native to the mobile computing device, wherein the response includes a login form displayed on a screen of the mobile computing device for authenticating credentials of a user;
    activating an application on the mobile computing device configured to fill the login form;
    displaying a quick login keyboard comprising:
    a plurality of credential data boxes configured to hold credential data of the user for authentication of the user by the native application; and
    a plurality of separate fill buttons, each associated with a respective one of the plurality of credential data boxes;
    detecting a tapping on one of the plurality of separate fill buttons;
    filling the respective one of the plurality of credential data boxes with data associated with the tapped fill button;
    detecting an additional tapping on an additional fill button; and
    filling another one of the plurality of the credential data boxes with data associated with the tapped additional fill button.

11. The non-transitory computer-readable storage medium of claim 10, further comprising:
    detecting a tapping on a close button displayed on the quick login keyboard; and
    replacing the quick login keyboard with a keyboard that was displayed prior to the quick login keyboard.

12. The non-transitory computer-readable storage medium of claim 10, further comprising:
    determining whether a database associated with the fast filling application includes one or more matching records of the native application; and
    based on a determination that the database includes only one matching stored record, displaying on the screen an editing button for triggering an editing process of the matching stored record.

13. The non-transitory computer-readable storage medium of claim 12, further comprising:
    in case the database is found to have a plurality matching stored records,
    displaying a multiple-selection box; and
    detecting a selection of one of the plurality of matching stored records, and displaying on the screen the editing button to be tapped by the user to edit the one of the plurality of matching stored records.

14. The non-transitory computer-readable storage medium of claim 13, further comprising:
   determining that the editing process was performed; and
   storing the edited matching record in the database.

15. The non-transitory computer-readable storage medium of claim 14, further comprising:
   displaying the quick login keyboard to enable the user to quickly login using the edited matching record.

16. The non-transitory computer-readable storage medium of claim 10, further comprising:
   transmitting the login form populated with the credential data to a server.

17. The non-transitory computer-readable storage medium of claim 10, further comprising:
   communicating to the native application the populated login form when the detected response is from the native application.

18. The non-transitory computer-readable storage medium of claim 10, further comprising:
   displaying a login softkey on the screen of the mobile computing device that may be tapped by the user for proceeding with the quick login.

19. A computer-implemented method for facilitating a quick login using a mobile computing device having a space-wise limited virtual keyboard, the method comprising:
   detecting a response from an application native to the mobile computing device, wherein the response includes a login form displayed on a screen of the mobile computing device for authenticating credentials of a user;
   activating an application on the mobile computing device configured to fill the login form;
   detecting tapping on a first tapped fill button;
   filling one of a plurality of credential data boxes with data associated with the first tapped fill button;
   detecting a tapping on a second fill button; and
   filling another one of the plurality of the credential data boxes with data associated with the tapped second fill button.

\* \* \* \* \*